(12) United States Patent
Chen

(10) Patent No.: US 9,170,358 B2
(45) Date of Patent: Oct. 27, 2015

(54) METALLIC STRUCTURE AND OPTO-ELECTRONIC APPARATUS

(71) Applicant: National Cheng Kung University, Tainan (TW)

(72) Inventor: Kuan-Ren Chen, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 263 days.

(21) Appl. No.: 13/657,931

(22) Filed: Oct. 23, 2012

(65) Prior Publication Data
US 2013/0128356 A1 May 23, 2013

(30) Foreign Application Priority Data
Nov. 23, 2011 (TW) .............................. 100142940 A

(51) Int. Cl.
*G02B 5/30* (2006.01)
*B82Y 20/00* (2011.01)

(52) U.S. Cl.
CPC ............... *G02B 5/3058* (2013.01); *B82Y 20/00* (2013.01); *G02B 2207/101* (2013.01)

(58) Field of Classification Search
CPC . G02B 5/3058; G02B 2207/101; B82Y 20/00
USPC .............. 359/484.01, 484.09, 485.05, 487.03
See application file for complete search history.

(56) References Cited

U.S. PATENT DOCUMENTS

| 7,511,884 B2 * | 3/2009 | Flagello et al. ............... 359/352 |
| 7,619,816 B2 * | 11/2009 | Deng et al. ............... 359/484.01 |
| 7,683,982 B2 * | 3/2010 | Cho ................................ 349/96 |
| 7,755,717 B2 * | 7/2010 | Zhang et al. ..................... 349/96 |
| 7,755,718 B2 * | 7/2010 | Amako et al. ................... 349/96 |
| 2004/0096136 A1 * | 5/2004 | Singh et al. ........................ 385/1 |
| 2008/0217558 A1 | 9/2008 | Van Herpen et al. |
| 2011/0043813 A1 * | 2/2011 | Yamada ........................ 356/447 |
| 2011/0080640 A1 | 4/2011 | Kaida et al. |
| 2011/0273771 A1 | 11/2011 | Oigawa et al. |

FOREIGN PATENT DOCUMENTS

| JP | 2007-272016 | 10/2007 |
| JP | 2009-223074 | 10/2009 |
| JP | 2010-186164 | 8/2010 |
| JP | 2011-164206 | 8/2011 |

OTHER PUBLICATIONS

English translation of abstract of JP 2009-223074 (published Oct. 1, 2009).

(Continued)

*Primary Examiner* — Frank Font
(74) *Attorney, Agent, or Firm* — McClure, Qualey & Rodack, LLP

(57) ABSTRACT

A metallic structure and an opto-electronic apparatus are provided. The metallic structure is used for filtering or polarizing an electromagnetic wave, and includes a light-permissible medium, a first metallic block and a second metallic block. The first and second metallic blocks are parallel to and spaced from each other at a predetermined distance (d), and are disposed inside or over the light-permissible medium. After passing through the metallic structure, the electromagnetic wave has a distribution curve of transmittance versus wavelength, wherein the distribution curve has at least one transmittance peak value corresponding to at least one wavelength in a one-to-one manner. The aforementioned predetermined distance (d) and an averaged width of the first metallic block satisfy the following relationships: $d<\lambda$; $0.01\lambda<w<d$, wherein $\lambda$ represents one of the aforementioned at least one wavelength.

24 Claims, 19 Drawing Sheets

(56) References Cited

OTHER PUBLICATIONS

English translation of abstract of JP 2007-272016 (published Oct. 18, 2007).

English translation of abstract of JP 2011-164206 (published Aug. 25, 2011).

English translation of abstract of JP 2010-186164 (published Aug. 26, 2010).

* cited by examiner

METALLIC STRUCTURE AND OPTO-ELECTRONIC APPARATUS

CROSS-REFERENCE TO RELATED APPLICATION

This application claims the priority benefit of Taiwan Application serial no. 100142940, filed on Nov. 23, 2011, the full disclosures of which are incorporated herein by reference.

BACKGROUND

1. Field of Invention

The present invention relates to a metallic structure and an opto-electronic apparatus. More particularly, the present invention relates to metallic structure and an opto-electronic apparatus for filtering and/or polarizing an electromagnetic wave.

2. Description of Related Art

Filtering of specific frequency spectrum and polarization are basic operations on electromagnetic waves. The materials and devices capable of color filtering and polarization provide important functionality in electro-optical systems, and are often critical parts of electro-optical systems for scientific, engineering, industrial, consumer, defense and many other applications. The peak transmission efficiency and the effective narrowing of the transmission spectrum are important factors for these applications.

The materials used by conventional skills are mostly dielectrics capable of interacting with electromagnetic waves such as dye, organic, plastic, etc., and are often in a form of film. Since decades ago, a net of metal wires were found to be capable of filtering waves within microwave frequency range, and recently has been improved up to far infrared.

Recently, it is found by scientists that the transmittance of electromagnetic waves can be enhanced through subwavelength holes in the metal film. Although the intensity of electromagnetic waves transmitted through the holes can be higher than that impinging on the area of the holes, yet the overall transmitted intensity is only a small fraction (e.g., less than 10%) of the incoming electromagnetic waves partially because the area of the holes is much smaller than the overall area irradiated by the incoming waves.

SUMMARY

Therefore, an object of the present invention is to provide a metallic structure for increasing the transmittance of an electromagnetic wave or effectively polarizing or filtering the electromagnetic wave.

According to the aforementioned object, an aspect of the present invention is to provide a metallic structure for filtering (or splitting) or polarizing an electromagnetic wave. The metallic structure includes a light transmissible medium, a first metallic block, a second metallic block. The first metallic block is disposed inside or over the light transmissible medium. The second metallic block is disposed inside or over the light transmissible medium, wherein the first metallic block and the second metallic block are substantially parallel to and spaced from each other at a predetermined distance. The electromagnetic wave is incident on the first metallic block and the second metallic block and into between the first metallic block and the second metallic block. After passing through the metallic structure, the electromagnetic wave has a distribution curve of transmittance versus wavelength, wherein the distribution curve has at least one transmittance peak value corresponding to at least one wavelength in a one-to-one manner. The aforementioned predetermined distance and an averaged width of the first metallic block satisfies the following relationships: $d<\lambda$; $0.01\lambda<w<d$, where d represents the aforementioned predetermined distance; $\lambda$ represents one of the aforementioned at least one wavelength; w represents an averaged width of the first metallic block.

In another embodiment, the aforementioned predetermined distance and the averaged width of the first metallic block satisfies the following relationship:

$$d+w<\lambda.$$

In another embodiment, an averaged length of the first metallic block satisfies the following relationship $l<2\lambda$, wherein l represents the averaged length of the first metallic block.

In another embodiment, $\lambda$ is corresponding to one (referred to as a first transmittance peak value hereinafter) of the aforementioned at least one transmittance peak value, and the first transmittance peak value is greater than 10%, and a spectrum half width corresponding to between the wavelength of the first transmittance peak value and the wavelength whose transmittance is 70% of the first transmittance peak value is smaller than $2\lambda/3$.

In another embodiment, the aforementioned electromagnetic wave includes a range wavelength which is substantially between 0.1 µm and 12 µm.

In another embodiment, the aforementioned metallic structure further includes a third metallic block which is disposed inside or over the light transmissible medium and is adjacent to one side of the first metallic block and the second metallic block.

In another embodiment, the aforementioned third metallic block does not simultaneously contact the first metallic block and the second metallic block.

In another embodiment, an extension of the aforementioned third metallic block is substantially perpendicular to extensions of the first metallic block and the second metallic block.

In another embodiment, the aforementioned metallic structure further includes a fourth metallic block which is disposed inside or over the light transmissible medium and is adjacent to the other side of the first metallic block and the second metallic block.

In another embodiment, the aforementioned fourth metallic block does not simultaneously contact the first metallic block and the second metallic block.

In another embodiment, an extension of the aforementioned fourth metallic block is substantially perpendicular to extensions of the first metallic block and the second metallic block.

In another embodiment, the aforementioned fourth metallic block is spaced from the third metallic block at a distance smaller than $2\lambda$.

In another embodiment, the aforementioned metallic structure further includes a metallic frame disposed inside or over the light transmissible medium, wherein the first metallic block, the second metallic block, the third metallic block and the fourth metallic block is disposed inside or overlapped with the metallic frame.

According to the aforementioned object, another metallic structure is provided to polarize or to filter an electromagnetic wave. This metallic structure includes a light transmissible medium and a metallic array. The metallic array is disposed inside or over the light transmissible medium, and the metallic array includes a plurality of array units. Each of the metallic array units includes the aforementioned first metallic block and the aforementioned second metallic block.

In another embodiment, at least one of the aforementioned metallic array units includes the aforementioned third metallic block.

In another embodiment, the aforementioned at least one of the aforementioned metallic array units includes the aforementioned fourth metallic block.

In another embodiment, the aforementioned at least one of the aforementioned metallic array units includes the aforementioned metallic frame.

Furthermore, another aspect of the present invention is to provide an opto-electronic apparatus (e.g. a display device) including one of the aforementioned metallic structures.

With the applications of the aforementioned embodiments, the transmittance of the electromagnetic wave can be increased or the electromagnetic wave can be effectively polarized.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
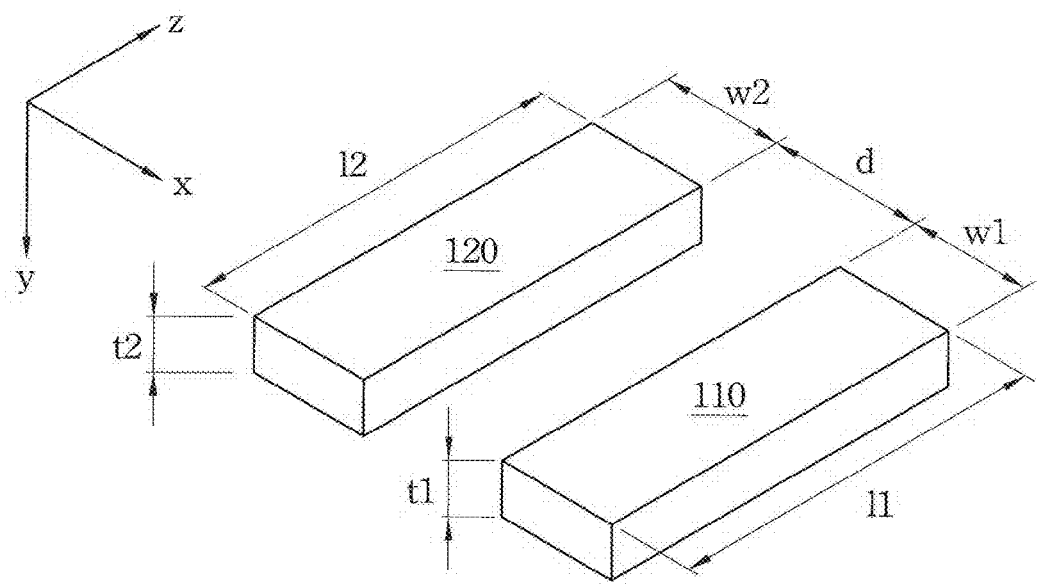
FIG. 1A is schematic 3-D diagram of a metallic structure according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Electrons on the surface of metallic materials can strongly interact with electromagnetic fields, depending on its polarization. In fact, the collective electron motions have plasmonic eigenmodes of which the frequency is proportional to the square root of the electron density that is higher for regular metals and lower for doped semiconductors. A typical plasmonic frequency is in the range from ultraviolet to infrared.

The present invention utilizes the aforementioned interaction to achieve good filtering and polarization as well as high transmission efficiency. Electromagnetic force is a long range force, so that the aforementioned interaction does not require a physical contact. Although the multiple metallic blocks or sheets disposed inside or over the light transmissible medium may or may not contact each other, the electrons on one metallic block or sheet can interact with the electromagnetic wave fields which at the same time also interact with the electrons on another block or sheet nearby. These coupled interactions can occur even when there is no physical contact between two blocks/sheets, allowing the surface plasmons to propagate (or the electrons and the electron oscillations to flow) from one block/sheet to another block/sheet. The electric field of the electromagnetic wave has a component (vertically polarized wave) perpendicular to the boundary of the block/sheet, and a component (parallel polarized wave) parallel to the boundary of the block/sheet. These coupled interactions through the electric field can be further enhanced by the polarization effect induced at the boundary surface of the blocks/sheets. The metallic block of the present invention is referred to a square block, a rectangular block or a block in another shape formed from a metallic material. The metallic material is referred to a metal material or a material with partial metallic characters, wherein the metal material can be such as copper, aluminum, alloy, etc., and the material with partial metallic characters can be such as a semiconductor material or a mixture containing the semiconductor material. The light transmissible medium of the present invention can be any light transmissible material, such as air, glass, dielectric, etc.

When the medium (such as the boundary or width of the metallic block) is changed, the electron oscillations will be reflected or partially reflected. The electron oscillations will vigorously interact with the parallel and perpendicular polarized waves, and respectively affect the transmission and reflection of the parallel and perpendicular polarized waves. The geometrical changes of the metallic blocks (such as the changes of respective lengths, widths and thickness thereof) can all affect the electron oscillations and the interactions with the parallel and perpendicular polarized waves of light, and thus affect the transmission, filtering and polarization of light, wherein the interactions can be understood by a finite-difference time-domain (FDTD) simulation.

On the other hand, a metallic structure of the preset invention is applicable to an opto-electronic apparatus such as a filter, a polarizer, a wave splitter, a sensor or a display, etc. The metallic structure of the present invention is used for filtering (splitter) or polarizing an electromagnetic wave, wherein the electromagnetic wave includes a preferable range wavelength which is substantially between 0.1 μm and 12 μm, and more preferably, substantially between 0.1 μm and 2 μm (as shown in the following simulation results). However, the wavelength range of the electromagnetic wave which can be processed by the metallic structure of the present invention is not limited thereto, and may be the wavelength within any range.

Hereinafter, several embodiments are illustrated for explaining metallic structures of the present invention, wherein metallic blocks forming the metallic structures used in examples corresponding to respective embodiments are formed from Al—Cu alloy, and a light transmissible medium used in each example is air, and the metallic blocks can be fixed on an opto-electronic apparatus by means of an appropriate mechanism. In the following embodiments, same reference numbers shown in the figures represent same or similar elements.

Figure 1B:
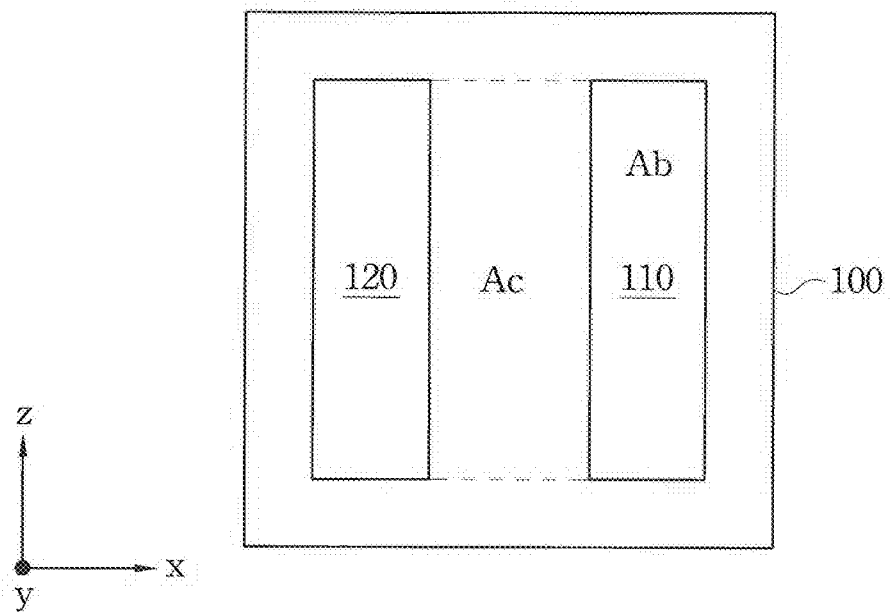
FIG. 1B is a schematic top view of the metallic structure according to a first example and a second example of applying the first embodiment.

Referring to FIG. 1A and FIG. 1B, FIG. 1A is schematic 3-D diagram of a metallic structure according to a first embodiment of the present invention, and FIG. 1B is a schematic top view of the metallic structure according to a first example and a second example of applying the first embodiment. The first embodiment is a basic metallic structure of the present invention, and for convenience of explanation, a light transmissible medium 100 is omitted in FIG. 1A. As shown in FIG. 1A, the basic metallic structure of the present invention is formed from two substantially parallel metallic blocks, including a first metallic block 110 and a second metallic block 120, used for filtering or polarizing an electromagnetic wave. As shown in FIG. 1B, the first metallic block 110 and the second metallic block 120 are disposed inside or over a surface of the light transmissible medium 100, wherein the size of the light transmissible medium 100 is merely used as an example for explanation, and do not intend to limit embodiments of the present invention. In fact, the size of the light transmissible medium 100 may be adjusted in accordance with actual needs. Furthermore, if light transmissible medium 100 fails to provide support to the metallic structure, an appropriate support mechanism is required to be designed additionally, which is well known to those who are skilled in the art and not described herein.

The first metallic block 110 and the second metallic block 120 are spaced from each other at a predetermined distance d, wherein the electromagnetic wave is incident on surfaces of the first metallic block 110 and the second metallic block 120 and between the first metallic block 110 and the second metallic block 120.

Figure 2A:
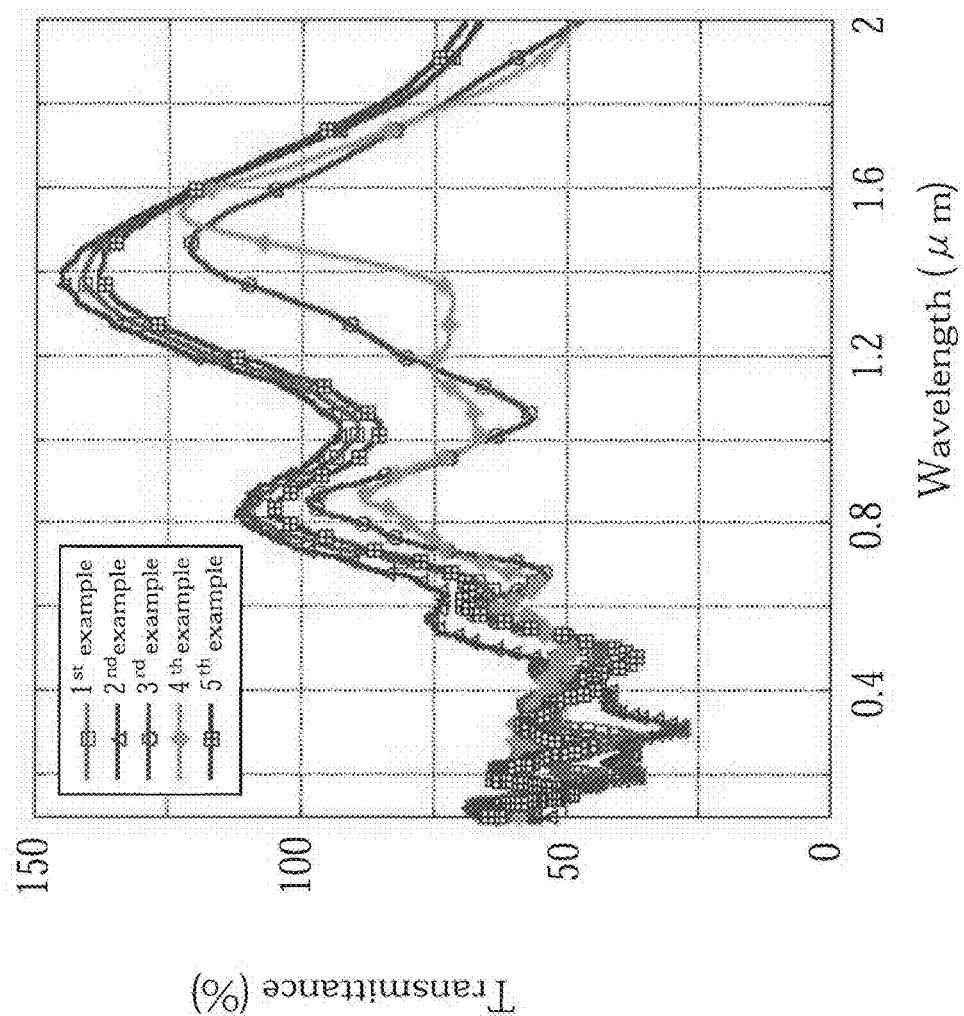
FIG. 2A shows distribution curves of x-axis transmittance versus wavelength obtained by simulating the first to fifth examples of applying the first embodiment.
Figure 2B:
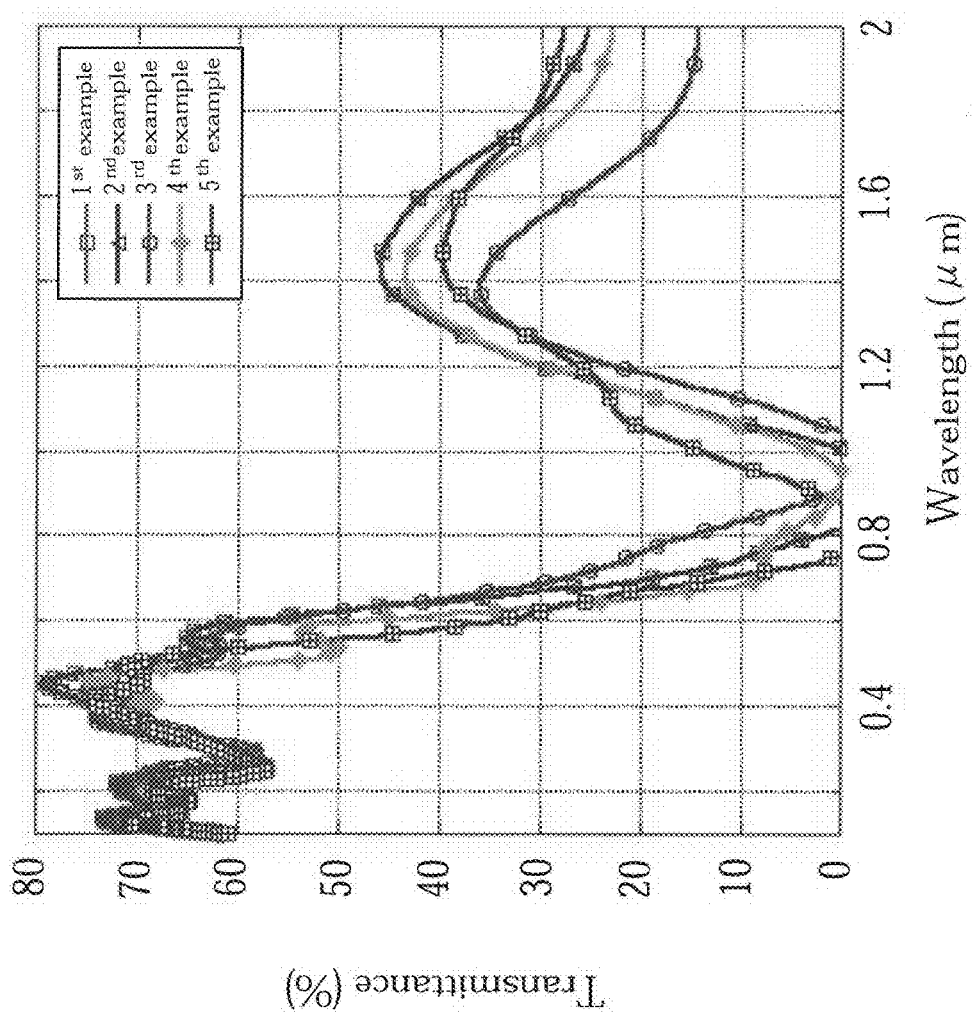
FIG. 2B shows distribution curves of z-axis transmittance versus wavelength obtained by simulating the first to fifth examples of applying the first embodiment.

As shown in FIG. 2A and FIG. 2B, after passing through the metallic structure, the electromagnetic wave has a distribution curve of transmittance versus wavelength, wherein the distribution curve has at least one transmittance peak value corresponding to at least one wavelength in a one-to-one manner. The predetermined distance d and an averaged width w1 of the first metallic block 110 satisfies the following relationships:

$$d < \lambda \tag{1}$$

$$0.01\lambda < w1 < d \tag{2}$$

where λ represents one of the at least one wavelength.

The predetermined distance d and the averaged width w1 of the first metallic block 110 also satisfy the following relationship:

$$d + w1 < \lambda \tag{3}$$

An averaged length l1 of the first metallic block 110 satisfies the following relationship:

$$l1 < 2\lambda \tag{4}$$

Furthermore, λ is corresponding to one (a first transmittance peak value) of the at least one transmittance peak value, and the first transmittance peak value is greater than 10%, and a spectrum half width corresponding to between the wavelength of the first transmittance peak value and the wavelength whose transmittance is 70% of the first transmittance peak value is smaller than 2λ/3. It is worthy of being noted that λ is a wavelength desired to be obtained by performing a filtering operation using the metallic structure of the present invention, such as red light wavelength, green light wavelength or blue light wavelength, etc.

As shown in FIG. 1B, a transmittance is a ratio of the intensities of the electromagnetic wave before or after entering an area Ac between the second metallic block 120 and the first metallic block 110 plus an area Ab of the first metallic block 110. Since the predetermined distance d is smaller than λ, electrons or plasmons on the second metallic block 120 and the first metallic block 110 are coupled with the electric field of the electromagnetic wave, such that the metallic structure of the present invention has excellent filtering and polarizing effects. The transmittance can be divided into a component (referred as a x-axis transmittance, as shown in FIG. 2A)

passing through an electric field along the x axis (substantially perpendicular to the longitudinal direction of the second metallic block 120 and the first metallic block 110), and a component (referred as a z-axis transmittance, as shown in FIG. 2B) passing through an electric field along the z axis (substantially parallel to the longitudinal direction of the second metallic block 120 and the first metallic block 110). From the distribution curves of x-axis transmittance versus wavelength and those of z-axis transmittance versus wavelength, the filtering and polarizing effects of the metallic structure of this embodiment can be known, wherein the x-axis transmittance component and the z-axis transmittance component may exhibit the polarizing effect of the metallic structure, and the transmittance at a peak value, a valley value or zero may exhibit the filtering effect. When the transmittance is at a peak value, it means that the electromagnetic wave with a wavelength corresponding to the transmittance can pass through the metallic structure. When the transmittance is at a valley value or zero, it means that the electromagnetic wave with a wavelength corresponding to the transmittance is filtered out by the metallic structure. In the following, examples of applying the first embodiment are illustrated for explanation. Referring to FIG. 2A and FIG. 2B, FIG. 2A shows distribution curves of x-axis transmittance versus wavelength obtained by simulating the first to fifth examples of applying the first embodiment, and FIG. 2B shows distribution curves of z-axis transmittance versus wavelength obtained by simulating first to fifth examples of applying the first embodiment.

First Example

In this example, the length l1 of the first metallic block 110 is 0.32 µm; the width w1 thereof is 0.16 µm; and the thickness t1 thereof is 0.08 µm. The length l2 of the second metallic block 120 is 0.32 µm; the width w2 thereof is 0.16 µm; and the thickness t2 thereof is 0.08 µm. The predetermined distance d between the first metallic block 110 and the second metallic block 120 is 0.32 µm.

As shown in FIG. 2A, the curve corresponding to the first example has a plurality of transmittance peak values. At a transmittance peak value of 140%, the wavelength λ corresponding thereto is 1.4 µm, and thus the length l1, the width w1 of the first metallic block 110, and the predetermined distance d satisfy the aforementioned equations (1)-(4). Furthermore, the spectrum half width (1.4 µm-1.1 µm=0.3 µm) corresponding to between the wavelength of the first transmittance peak value (140%) and the wavelength whose transmittance is 70% of the first transmittance peak value (140%× 0.7=98%) is also smaller than 2λ/3 (0.93 µm).

As shown in FIG. 2B, the curve corresponding to the first example has many transmittance peak values. At a transmittance peak value of 46%, the wavelength λ corresponding thereto is 1.45 µm, and thus the length l1 and the width w1 of the first metallic block 110, and hence the predetermined distance d satisfy the aforementioned equations (1)-(4). Furthermore, the spectrum half width (1.45 µm-1.25 µm=0.2 µm) corresponding to between the wavelength of the first transmittance peak value (46%) and the wavelength whose transmittance is 70% of the first transmittance peak value (46%× 0.7=32.2%) is also smaller than 2λ/3 (0.96 µm). At a transmittance peak value of 0%, the wavelength λ corresponding thereto is 0.8 µm, which is about equal to twice of the length l1 (0.32 µm), in which the phenomenon is relevant to the surface plasmons discussed above.

From FIG. 2A and FIG. 2B, it can be known that the metallic structure of this example has good filtering and polarizing effects.

Second Example

The second example is different from the first example in that the thickness t1 of the first metallic block 110 and the thickness t2 of the second metallic block 120 both are 0.16 µm.

From FIG. 2A and FIG. 2B, it can be known that the length l1, the width w1 of the first metallic block 110, and the predetermined distance d of this example satisfy the aforementioned equations (1)-(4), and the metallic structure of this example has good filtering and polarizing effects.

From the first example and the second example, it can be known that different thickness of the metallic block does not greatly affect the filtering and polarizing. The thickness of the metallic block is generally smaller than the desired wavelength λ, but the present invention is not limited thereto.

Third Example

Figure 1C:
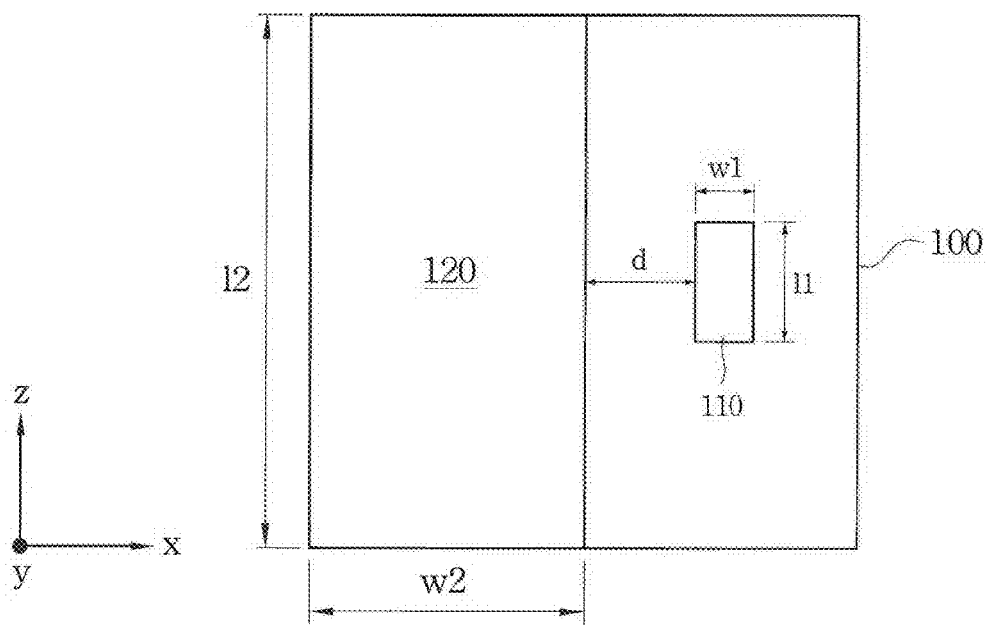
FIG. 1C is a schematic top view of the metallic structure according to a third example of applying the first embodiment.

Referring to FIG. 1C, FIG. 1C is a schematic top view of the metallic structure according to the third example of applying the first embodiment. In this example, the length l1 of the first metallic block 110 is 0.32 µm; the width w1 thereof is 0.16 µm; and the thickness t1 thereof is 0.08 µm. The length l2 of the second metallic block 120 is 4.0 µm; the width w2 thereof is 1.84 µm; and the thickness t2 thereof is 0.08 µm. The predetermined distance d between the first metallic block 110 and the second metallic block 120 is 0.32 µm.

From FIG. 2A and FIG. 2B, it can be known that the length l1, the width w1 of the first metallic block 110, and the predetermined distance d of this example satisfy the aforementioned equations (1)-(4), and the metallic structure of this example has good filtering and polarizing effects.

Fourth Example

Figure 1D:
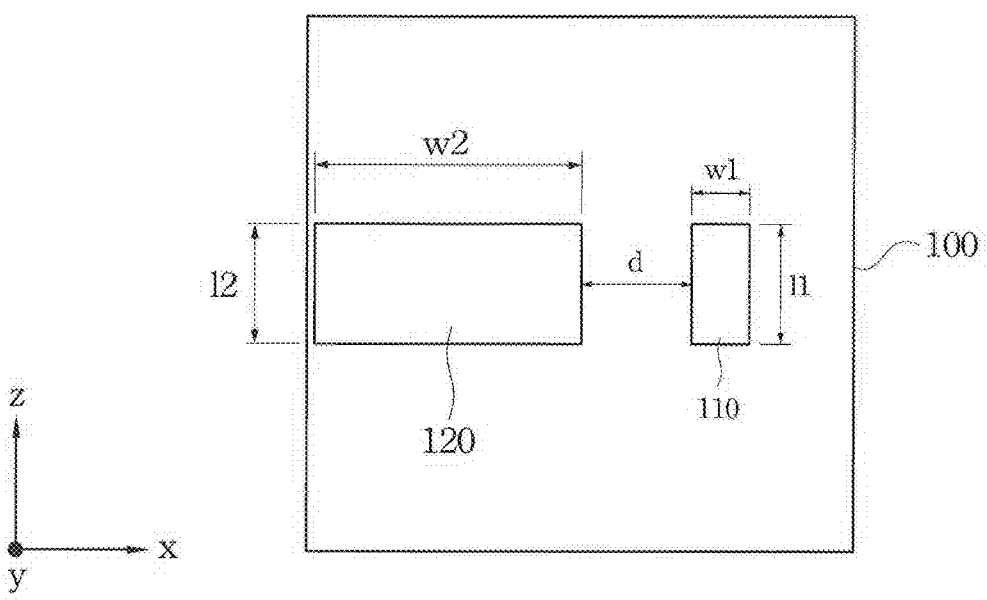
FIG. 1D is a schematic top view of the metallic structure according to a fourth example of applying the first embodiment.

Referring to FIG. 1D, FIG. 1D is a schematic top view of the metallic structure according to the fourth example of applying the first embodiment. In this example, the length l1 of the first metallic block 110 is 0.32 µm; the width w1 thereof is 0.16 µm; and the thickness t1 thereof is 0.08 µm. The length l2 of the second metallic block 120 is 0.32 µm; the width w2 thereof is 1.84 µm; and the thickness t2 thereof is 0.08 µm. The predetermined distance d between the first metallic block 110 and the second metallic block 120 is 0.32 µm.

From FIG. 2A and FIG. 2B, it can be known that the length l1, the width w1 of the first metallic block 110, and the predetermined distance d of this example satisfy the aforementioned equations (1)-(4), and the metallic structure of this example has good filtering and polarizing effects.

Fifth Example

Figure 1E:
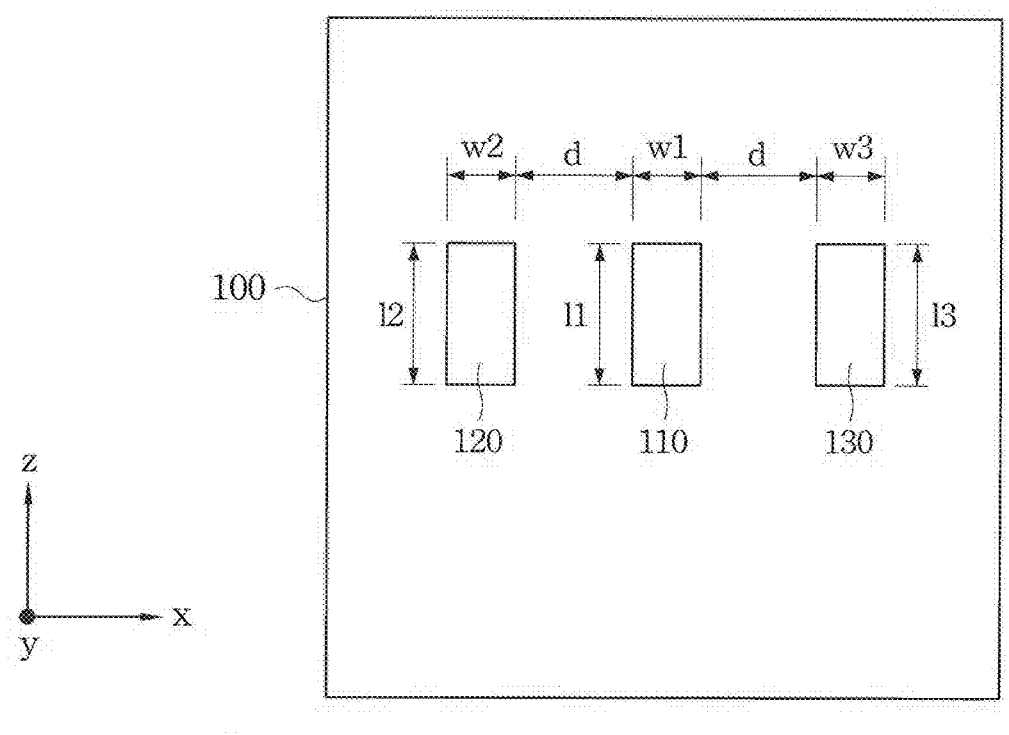
FIG. 1E is a schematic top view of the metallic structure according to a fifth example of applying the first embodiment.

Referring to FIG. 1E, FIG. 1E is a schematic top view of the metallic structure according to the fifth example of applying the first embodiment, wherein the first metallic block 110 is disposed between the second metallic block 120 and a third metallic block 130. The length l1 of the first metallic block 110 is 0.32 µm; the width w1 thereof is 0.16 µm; and the thickness t1 thereof is 0.08 µm. The length l2 of the second metallic block 120 is 0.32 µm; the width w2 thereof is 0.16 µm; and the thickness t2 thereof is 0.08 µm. The length l3 of the third metallic block 130 is 0.32 µm; the width w3 thereof is 0.16 μm; and the thickness t3 thereof is 0.08 μm. The predetermined distance d between the first metallic block 110 and the second metallic block 120 is 0.32 μm. The predetermined distance d between the first metallic block 110 and the third metallic block 130 is 0.32 μm.

From FIG. 2A and FIG. 2B, it can be known that the length l1 and the width w1 of the first metallic block 110, and the predetermined distance d of this example satisfy the aforementioned equations (1)-(4); the length l3 and the width w3 of the third metallic block 130, and the predetermined distance d also satisfy the aforementioned equations (1)-(4); and the metallic structure of this example has good filtering and polarizing effects.

It can be known that from FIG. 2B, the metallic structures in the above examples have excellent filtering and polarizing effects.

Second Embodiment

Figure 3A:
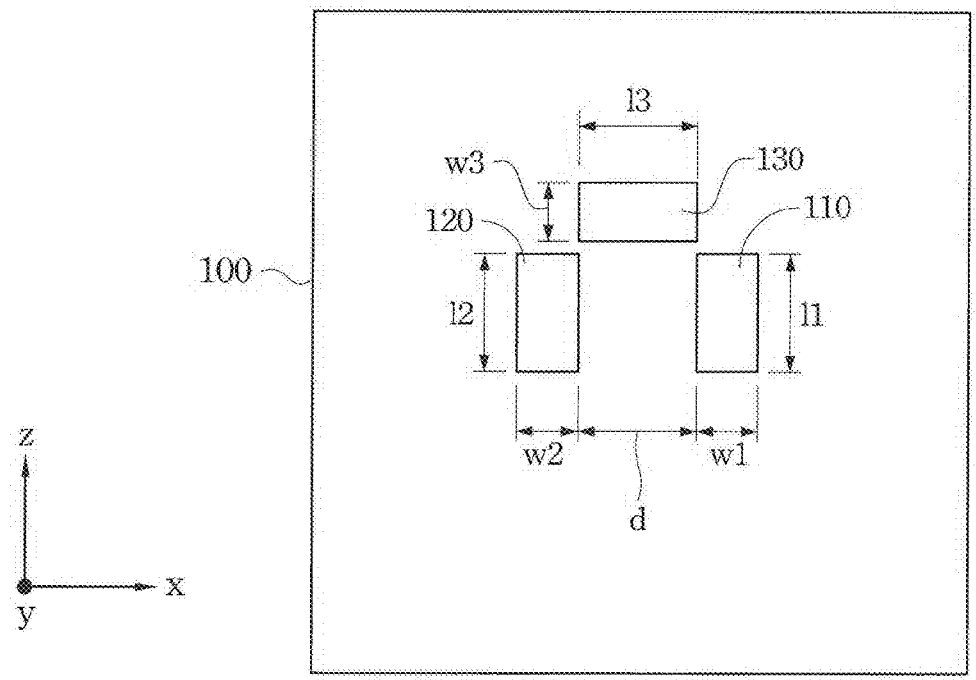
FIG. 3A is schematic top view of a metallic structure according to a first example of applying a second embodiment of the present invention.

Referring to FIG. 3A, FIG. 3A is schematic top view of a metallic structure according to a first example of applying a second embodiment of the present invention. The second embodiment is different from the first embodiment in that the metallic structure further includes a third metallic block 130. The third metallic block 130 is disposed inside or over the light transmissible medium 100 and is adjacent to one side of the first metallic block 110 and the second metallic block 120. An extension of the third metallic block 130 is substantially perpendicular to extensions of the first metallic block 110 and the second metallic block 120, and the third metallic block 130 may or may not simultaneously contact the first metallic block 110 and the second metallic block 120.

Figure 4A:
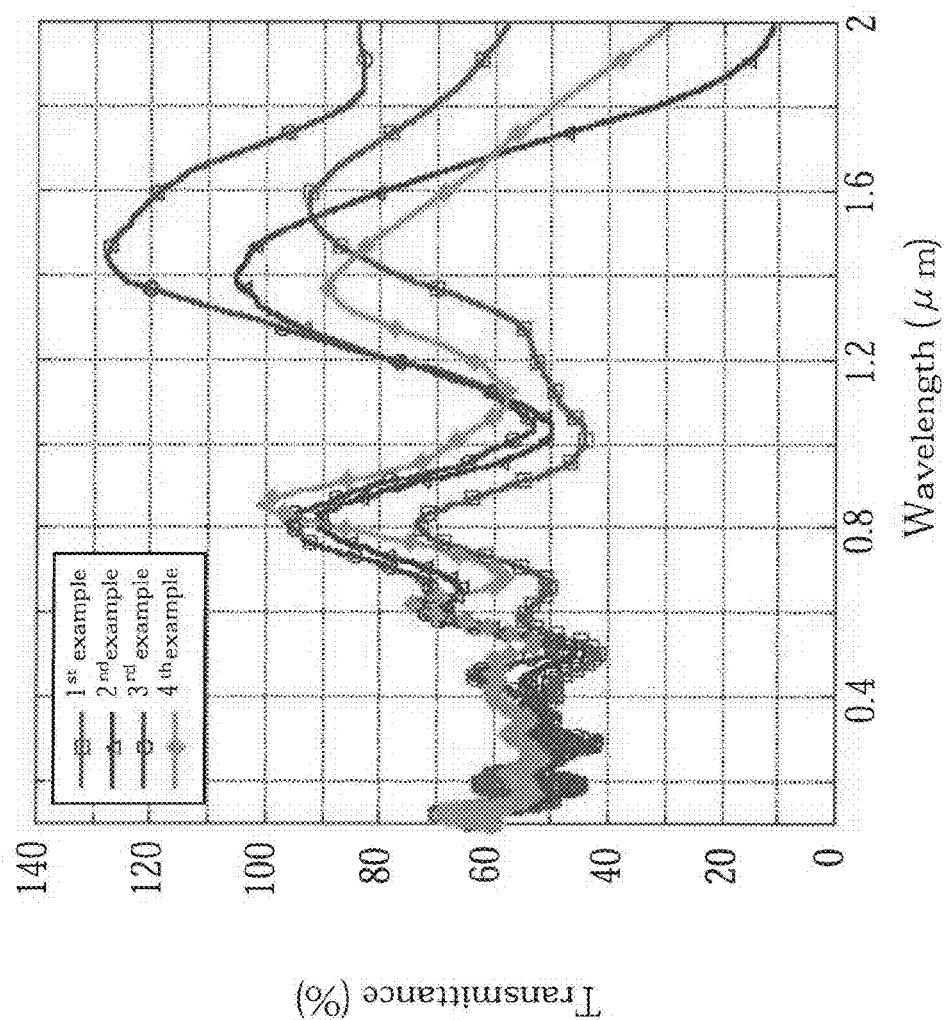
FIG. 4A shows distribution curves of x-axis transmittance versus wavelength obtained by simulating the first to fourth examples of applying the second embodiment.
Figure 4B:
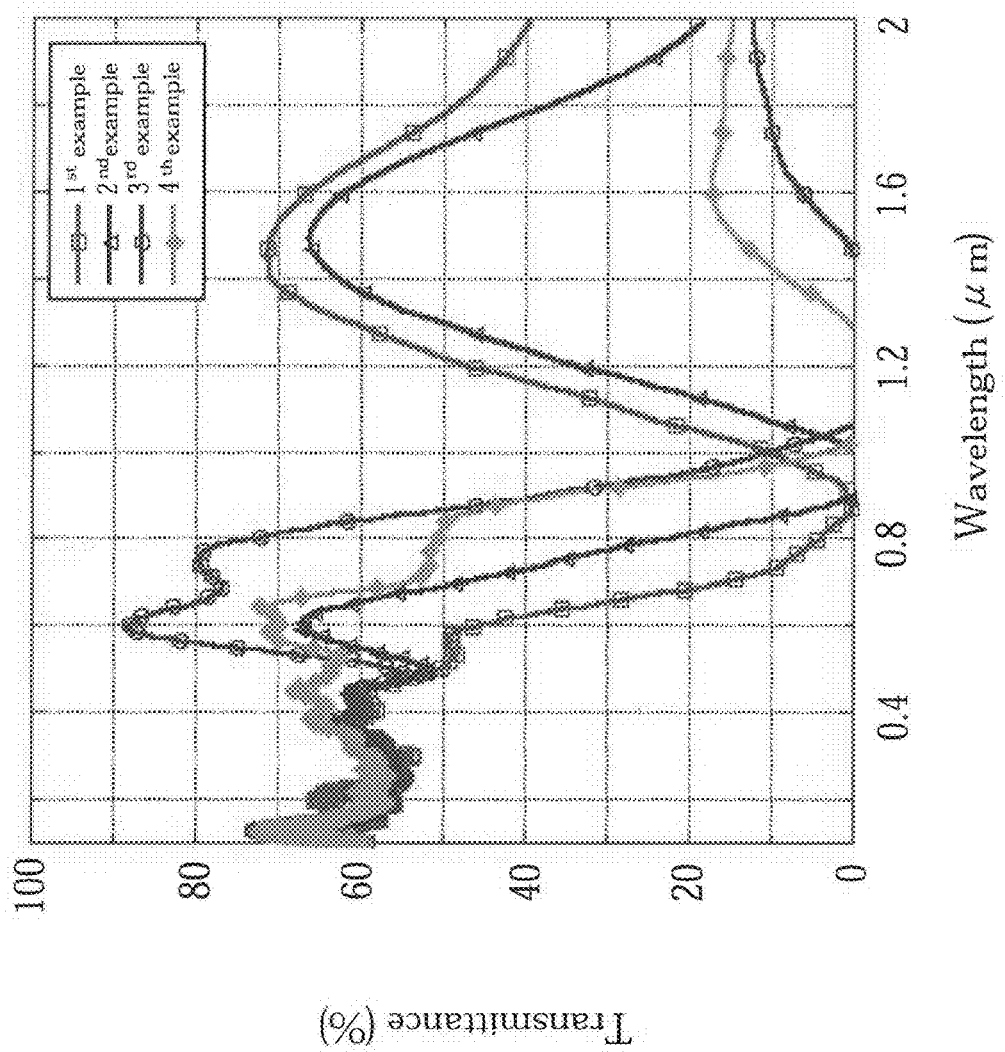
FIG. 4B shows distribution curves of z-axis transmittance versus wavelength obtained by simulating the first to fourth examples of applying the second embodiment.

In the following, examples of applying the second embodiment are illustrated for explanation. Referring to FIG. 4A and FIG. 4B, FIG. 4A shows distribution curves of x-axis transmittance versus wavelength obtained by simulating first to fourth examples of applying the second embodiment, and FIG. 4B shows distribution curves of z-axis transmittance versus wavelength obtained by simulating the first to fourth examples of applying the second embodiment.

First Example

As shown in FIG. 3A, the third metallic block 130 does not contact the first metallic block 110 and the second metallic block 120. The length l1 of the first metallic block 110 is 0.3 μm; the width w1 thereof is 0.16 μm; and the thickness t1 thereof is 0.08 μm. The length l2 of the second metallic block 120 is 0.3 μm; the width w2 thereof is 0.16 μm; and the thickness t2 thereof is 0.08 μm. The length l3 of the third metallic block 130 is 0.3 μm; the width w3 thereof is 0.16 μm; and the thickness t3 thereof is 0.08 μm. The predetermined distance d between the first metallic block 110 and the second metallic block 120 is 0.32 μm.

From FIG. 4A and FIG. 4B, it can be known that the length l1, the width w1 of the first metallic block 110, and the predetermined distance d of this example satisfy the aforementioned equations (1)-(4), and the metallic structure of this example has good filtering and polarizing effects.

Second Example

Figure 3B:
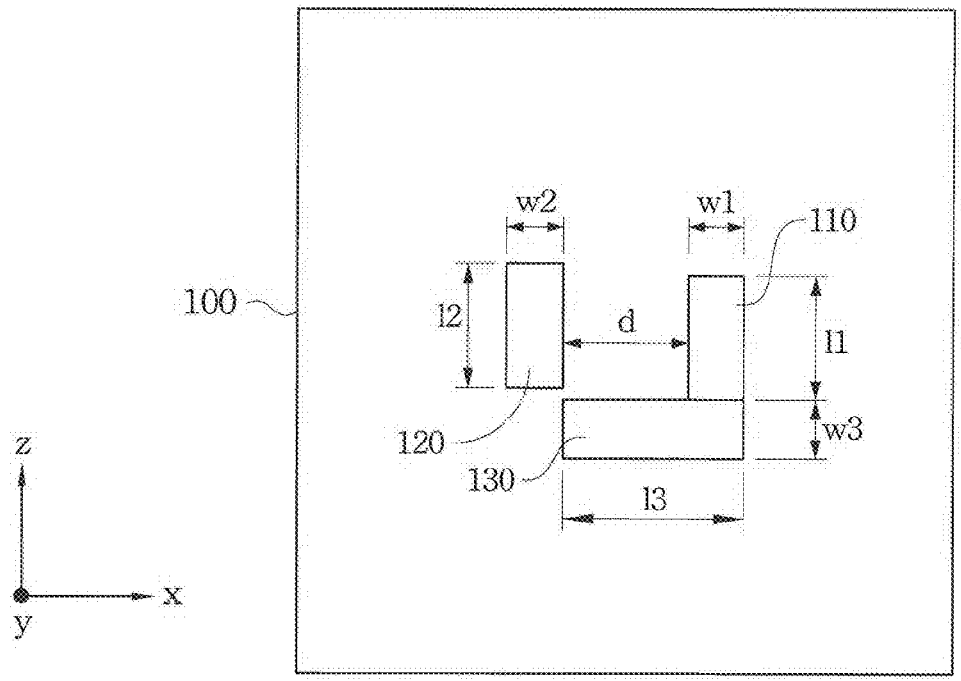
FIG. 3B is a schematic top view of the metallic structure according to a second example of applying the second embodiment.

Referring to FIG. 3B, FIG. 3B is a schematic top view of the metallic structure according to the second example of applying the second embodiment, wherein the third metallic block 130 contacts the first metallic block 110 but does not contact the second metallic block 120. The length l1 of the first metallic block 110 is 0.31 μm; the width w1 thereof is 0.16 μm; and the thickness t1 thereof is 0.08 μm. The length l2 of the second metallic block 120 is 0.3 μm; the width w2 thereof is 0.16 μm; and the thickness t2 thereof is 0.08 μm. The length l3 of the third metallic block 130 is 0.47 μm; the width w3 thereof is 0.16 μm; and the thickness t3 thereof is 0.08 μm. The predetermined distance d between the first metallic block 110 and the second metallic block 120 is 0.32 μm.

From FIG. 4A and FIG. 4B, it can be known that the length l1, the width w1 of the first metallic block 110, and the predetermined distance d of this example satisfy the aforementioned equations (1)-(4), and the metallic structure of this example has good filtering and polarizing effects.

Third Example

Figure 3C:
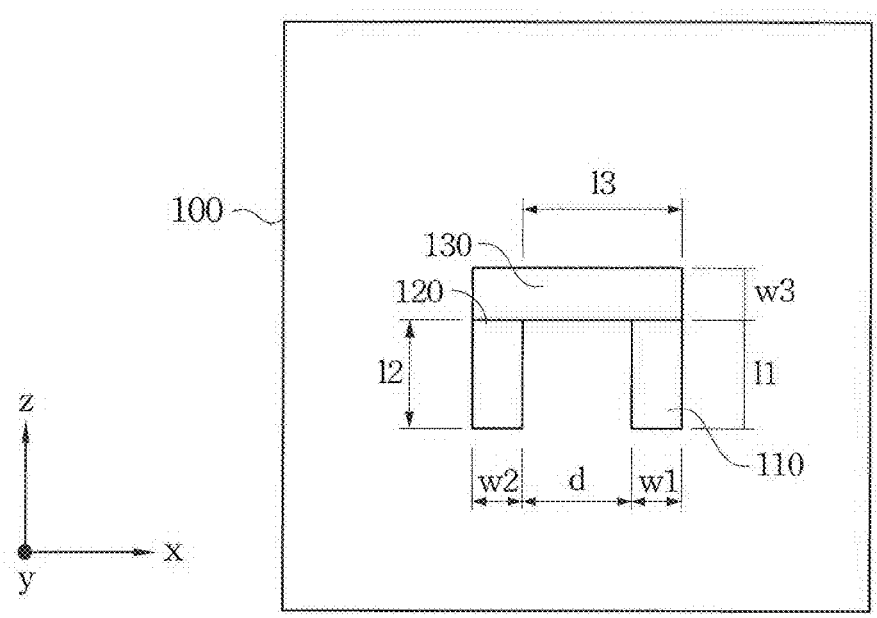
FIG. 3C is a schematic top view of the metallic structure according to a third example of applying the second embodiment.

Referring to FIG. 3C, FIG. 3C is a schematic top view of the metallic structure according to the third example of applying the second embodiment, wherein the third metallic block 130 simultaneously contacts the first metallic block 110 and the second metallic block 120. The length l1 of the first metallic block 110 is 0.31 μm; the width w1 thereof is 0.16 μm; and the thickness t1 thereof is 0.08 μm. The length l2 of the second metallic block 120 is 0.31 μm; the width w2 thereof is 0.16 μm; and the thickness t2 thereof is 0.08 μm. The length l3 of the third metallic block 130 is 0.64 μm; the width w3 thereof is 0.16 μm; and the thickness t3 thereof is 0.08 μm. The predetermined distance d between the first metallic block 110 and the second metallic block 120 is 0.32 μm.

From FIG. 4A and FIG. 4B, it can be known that the length l1, the width w1 of the first metallic block 110, and the predetermined distance d of this example satisfy the aforementioned equations (1)-(4), and the metallic structure of this example has good filtering and polarizing effects.

Fourth Example

Figure 3D:
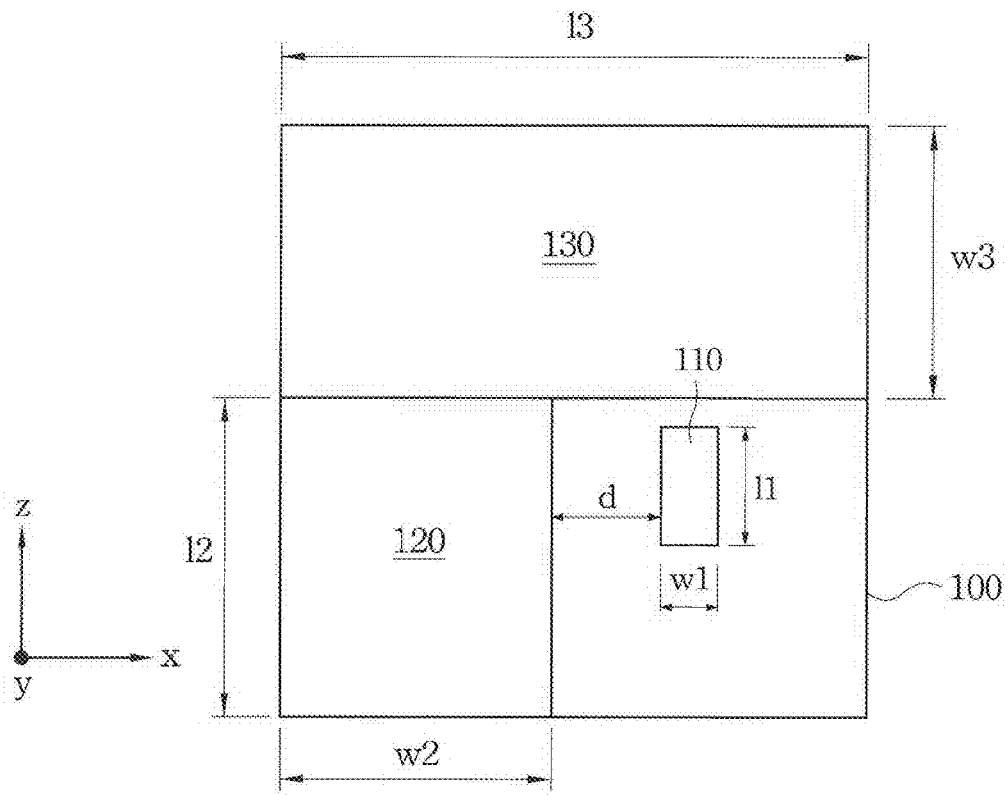
FIG. 3D is a schematic top view of the metallic structure according to a fourth example of applying the second embodiment.

Referring to FIG. 3D, FIG. 3D is a schematic top view of the metallic structure according to the fourth example of applying the second embodiment, wherein the third metallic block 130 does not contact the first metallic block 110 but contacts the second metallic block 120, and the size of the second metallic block 120 and the third metallic block 130 are much greater than that of the first metallic block 110. The length l1 of the first metallic block 110 is 0.3 μm; the width w1 thereof is 0.16 μm; and the thickness t1 thereof is 0.08 μm. The length l2 of the second metallic block 120 is 2.16 μm; the width w2 thereof is 1.84 μm; and the thickness t2 thereof is 0.08 μm. The length l3 of the third metallic block 130 is 4.00 μm; the width w3 thereof is 1.84 μm; and the thickness t3 thereof is 0.08 μm. The predetermined distance d between the first metallic block 110 and the second metallic block 120 is 0.32 μm.

From FIG. 4A and FIG. 4B, it can be known that the length l1 and the width w1 of the first metallic block 110, and the predetermined distance d of this example satisfy the aforementioned equations (1)-(4), and the metallic structure of this example has good filtering and polarizing effects.

It can be known that from FIG. 4B, the metallic structures in the above examples have excellent filtering and polarizing effects.

Third Embodiment

Figure 5A:
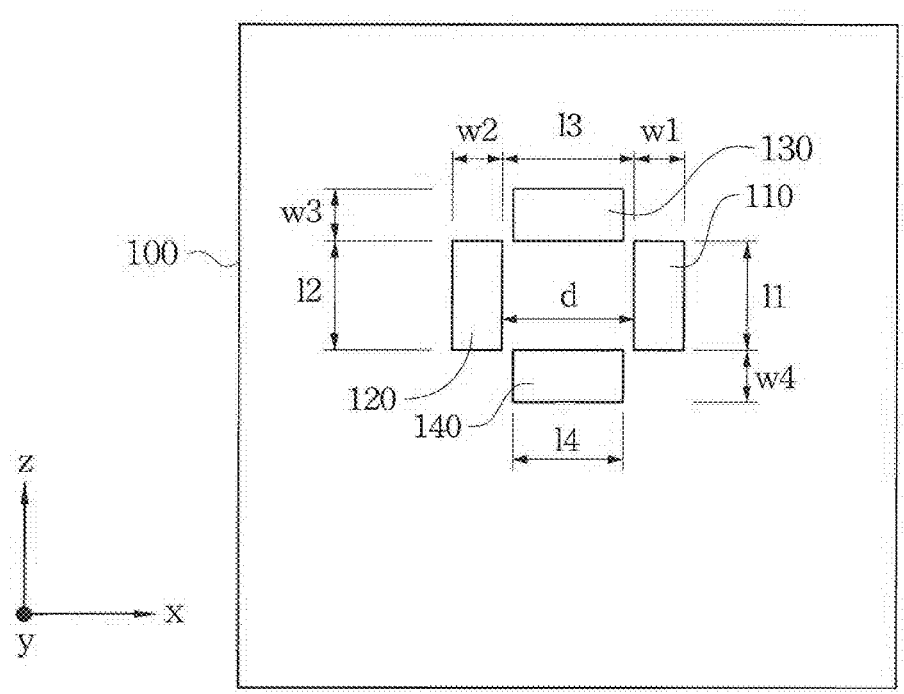
FIG. 5A is schematic top view of a metallic structure according to a first example of applying a third embodiment of the present invention.

Referring to FIG. 5A, FIG. 5A is schematic top view of a metallic structure according to a first example of applying a third embodiment of the present invention. The third embodiment is different from the second embodiment in that the metallic structure further includes a fourth metallic block 140. The fourth metallic block 140 is disposed inside or over the light transmissible medium 100 and is adjacent to the other side of the first metallic block 110 and the second metallic block 120. An extension of the fourth metallic block 140 is substantially perpendicular to extensions of the first metallic block 110 and the second metallic block 120, and the fourth metallic block 140 may or may not simultaneously contact the first metallic block 110 and the second metallic block 120.

Figure 6A:
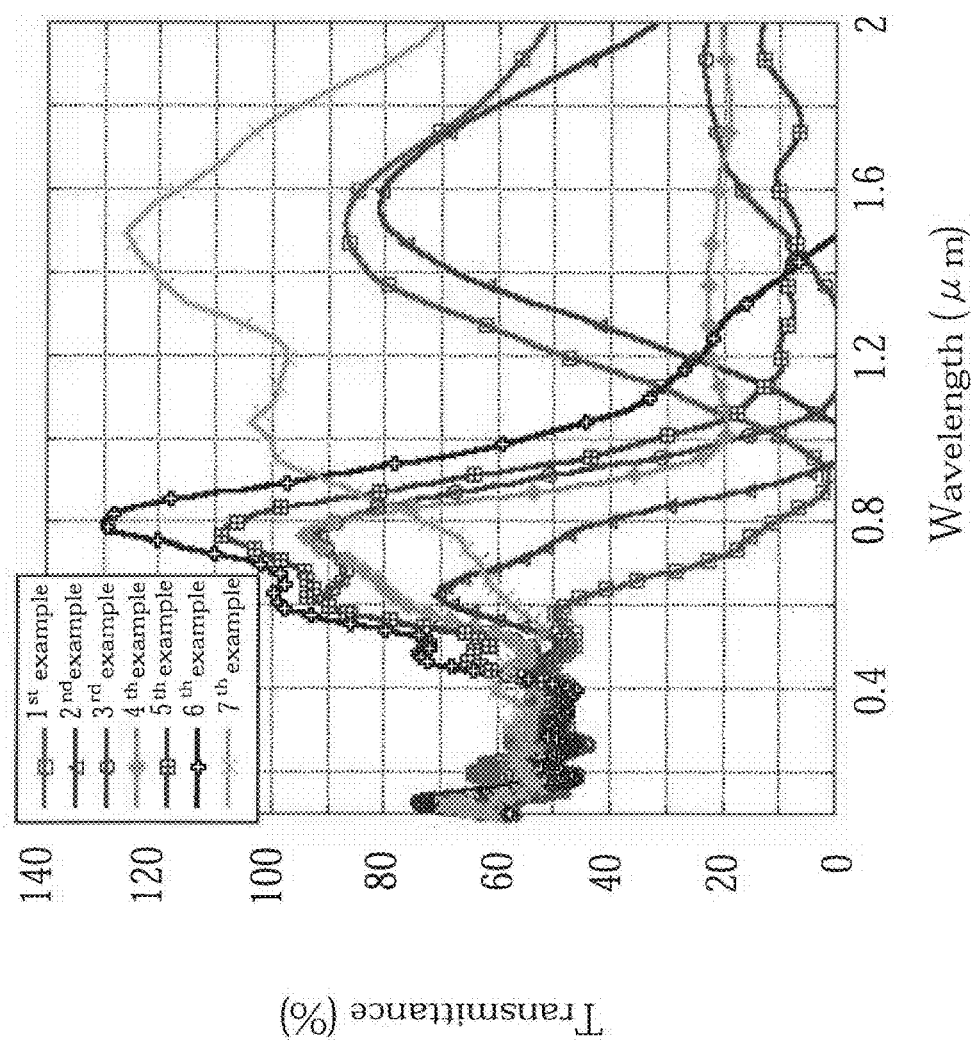
FIG. 6A shows distribution curves of x-axis transmittance versus wavelength obtained by simulating the first to seventh examples of applying the third embodiment.
Figure 6B:
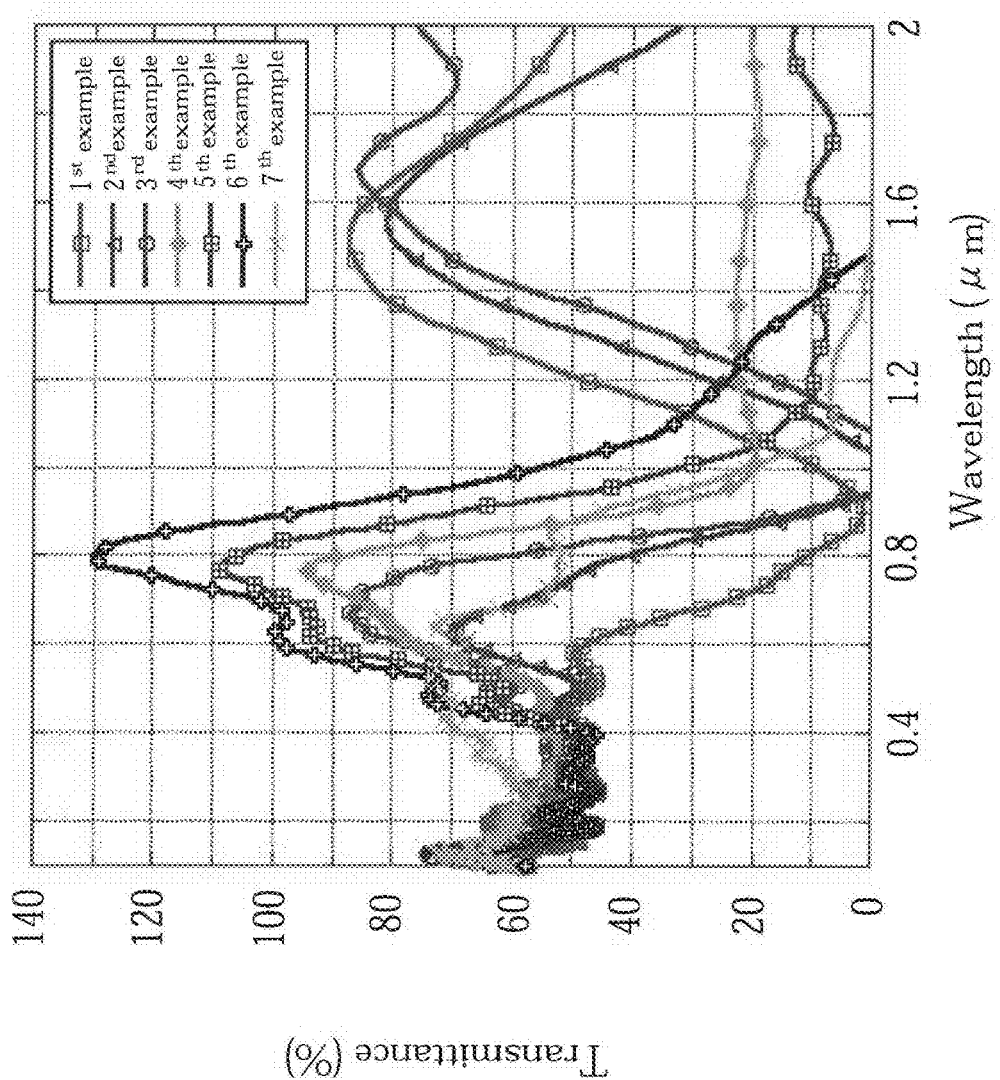
FIG. 6B shows distribution curves of z-axis transmittance versus wavelength obtained by simulating the first to seventh examples of applying the third embodiment.

In the following, examples of applying the third embodiment are illustrated for explanation. Referring to FIG. 6A and FIG. 6B, FIG. 6A shows distribution curves of x-axis transmittance versus wavelength obtained by simulating first to seventh examples of applying the third embodiment, and FIG. 6B shows distribution curves of z-axis transmittance versus wavelength obtained by simulating the first to seventh examples of applying the third embodiment.

First Example

As shown in FIG. 5A, the third metallic block 130 and the fourth metallic block 140 do not contact the first metallic block 110 and the second metallic block 120, wherein the length l1 of the first metallic block 110 is 0.3 µm; the width w1 thereof is 0.16 µm; and the thickness t1 thereof is 0.08 µm. The length l2 of the second metallic block 120 is 0.3 µm; the width w2 thereof is 0.16 µm; and the thickness t2 thereof is 0.08 µm. The length l3 of the third metallic block 130 is 0.3 µm; the width w3 thereof is 0.16 µm; and the thickness t3 thereof is 0.08 µm. The length l4 of the fourth metallic block 140 is 0.3 µm; the width w4 thereof is 0.16 µm; and the thickness t4 thereof is 0.08 µm. The predetermined distance d between the first metallic block 110 and the second metallic block 120 is 0.32 µm.

From FIG. 6A and FIG. 6B, it can be known that the length l1, the width w1 of the first metallic block 110, and the predetermined distance d of this example satisfy the aforementioned equations (1)-(4), and the metallic structure of this example has good filtering and polarizing effects. It is worthy of being noted that, since the metallic structure of this embodiment is symmetrical to the x axis and the z axis, the distribution curve of x-axis transmittance versus wavelength is identical to that of z-axis transmittance versus wavelength.

Second Example

Figure 5B:
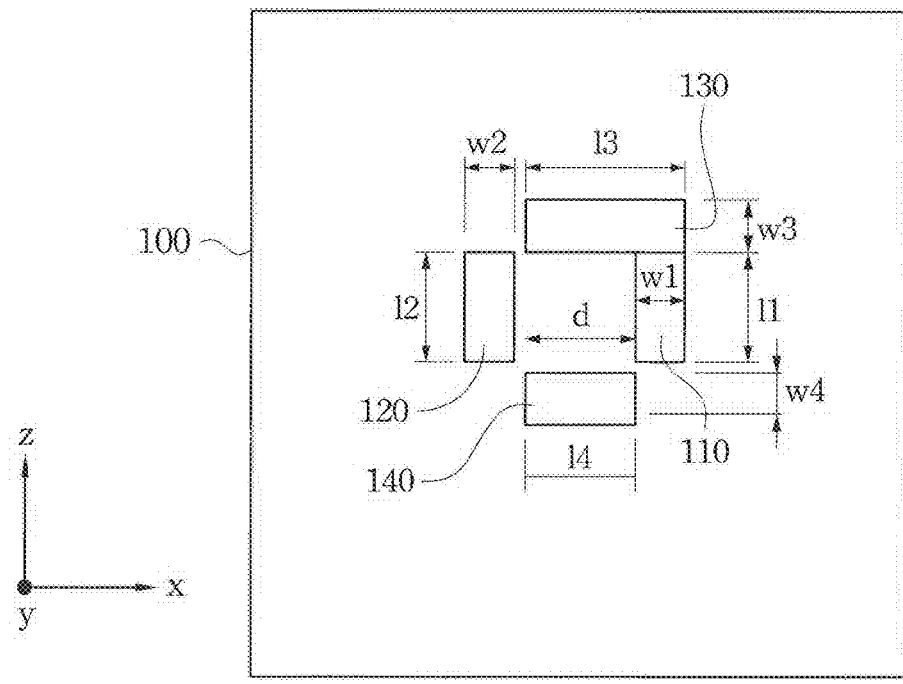
FIG. 5B is a schematic top view of the metallic structure according to a second example of applying the third embodiment.

Referring to FIG. 5B, FIG. 5B is a schematic top view of the metallic structure according to the second example of applying the third embodiment, wherein the third metallic block 130 contacts the first metallic block 110 but does not contact the second metallic block 120, and the fourth metallic block 140 does not contact the first metallic block 110 and the second metallic block 120. The length l1 of the first metallic block 110 is 0.31 µm; the width w1 thereof is 0.16 µm; and the thickness t1 thereof is 0.08 µm. The length l2 of the second metallic block 120 is 0.3 µm; the width w2 thereof is 0.16 µm; and the thickness t2 thereof is 0.08 µm. The length l3 of the third metallic block 130 is 0.47 µm; the width w3 thereof is 0.16 µm; and the thickness t3 thereof is 0.08 µm. The length l4 of the fourth metallic block 140 is 0.3 µm; the width w4 thereof is 0.16 µm; and the thickness t4 thereof is 0.08 µm. The predetermined distance d between the first metallic block 110 and the second metallic block 120 is 0.32 µm.

From FIG. 6A and FIG. 6B, it can be known that the length l1, the width w1 of the first metallic block 110, and the predetermined distance d of this example satisfy the aforementioned equations (1)-(4), and the metallic structure of this example has good filtering and polarizing effects.

Third Example

Figure 5C:
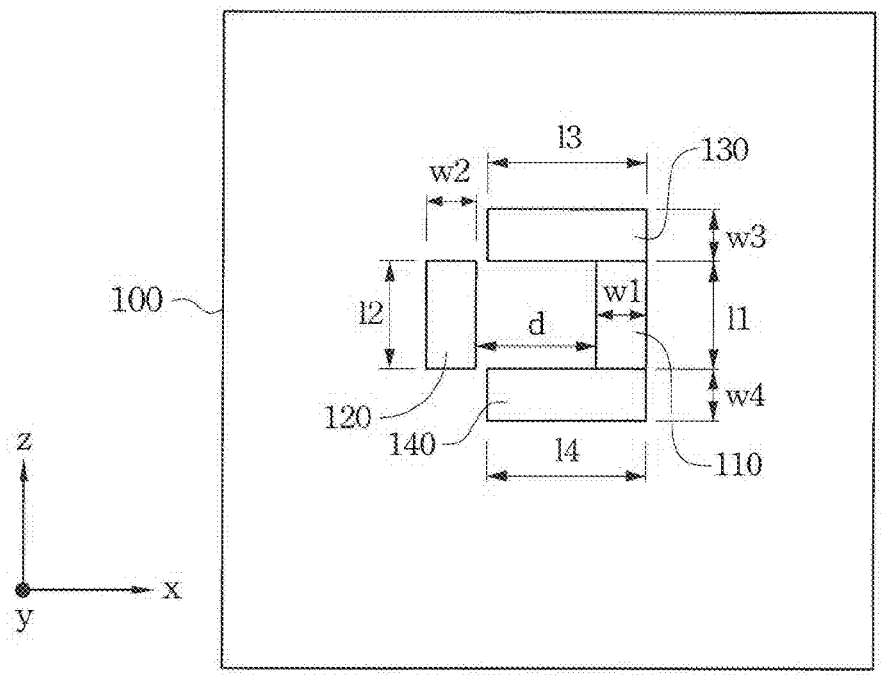
FIG. 5C is a schematic top view of the metallic structure according to a third example of applying the third embodiment.

Referring to FIG. 5C, FIG. 5C is a schematic top view of the metallic structure according to the third example of applying the third embodiment, wherein the third metallic block 130 contacts the first metallic block 110 but does not contact the second metallic block 120, and the fourth metallic block 140 contacts the first metallic block 110 but does not contact the second metallic block 120. The length l1 of the first metallic block 110 is 0.32 µm; the width w1 thereof is 0.16 µm; and the thickness t1 thereof is 0.08 µm. The length l2 of the second metallic block 120 is 0.3 µm; the width w2 thereof is 0.16 µm; and the thickness t2 thereof is 0.08 µm. The length l3 of the third metallic block 130 is 0.47 µm; the width w3 thereof is 0.16 µm; and the thickness t3 thereof is 0.08 µm. The length l4 of the third metallic block 130 is 0.47 µm; the width w4 thereof is 0.16 µm; and the thickness t4 thereof is 0.08 µm. The predetermined distance d between the first metallic block 110 and the second metallic block 120 is 0.32 µm.

From FIG. 6A and FIG. 6B, it can be known that the length l1, the width w1 of the first metallic block 110, and the predetermined distance d of this example satisfy the aforementioned equations (1)-(4), and the metallic structure of this example has good filtering and polarizing effects.

Fourth Example

Figure 5D:
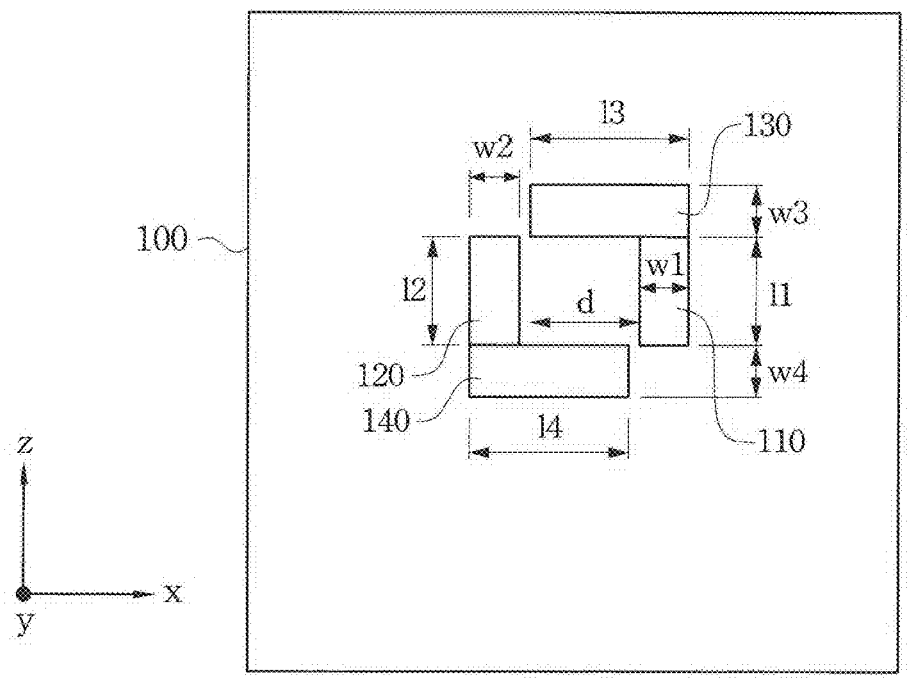
FIG. 5D is a schematic top view of the metallic structure according to a fourth example of applying the third embodiment.

Referring to FIG. 5D, FIG. 5D is a schematic top view of the metallic structure according to the fourth example of applying the third embodiment, wherein the third metallic block 130 contacts the first metallic block 110 but does not contact the second metallic block 120, and the fourth metallic block 140 does not contact the first metallic block 110 but contacts the second metallic block 120. The length l1 of the first metallic block 110 is 0.31 µm; the width w1 thereof is 0.16 µm; and the thickness t1 thereof is 0.08 µm. The length l2 of the second metallic block 120 is 0.31 µm; the width w2 thereof is 0.16 µm; and the thickness t2 thereof is 0.08 µm. The length l3 of the third metallic block 130 is 0.47 µm; the width w3 thereof is 0.16 µm; and the thickness t3 thereof is 0.08 µm. The length l4 of the third metallic block 130 is 0.47 µm; the width w4 thereof is 0.16 µm; and the thickness t4 thereof is 0.08 µm. The predetermined distance d between the first metallic block 110 and the second metallic block 120 is 0.32 µm.

From FIG. 6A and FIG. 6B, it can be known that the length l1, the width w1 of the first metallic block 110, and the predetermined distance d of this example satisfy the aforementioned equations (1)-(4), and the metallic structure of this example has good filtering and polarizing effects. It is worthy of being noted that, since the metallic structure of this embodiment is symmetrical to its center point, the distribution curve of x-axis transmittance versus wavelength is identical to that of z-axis transmittance versus wavelength.

Fifth Example

Figure 5E:
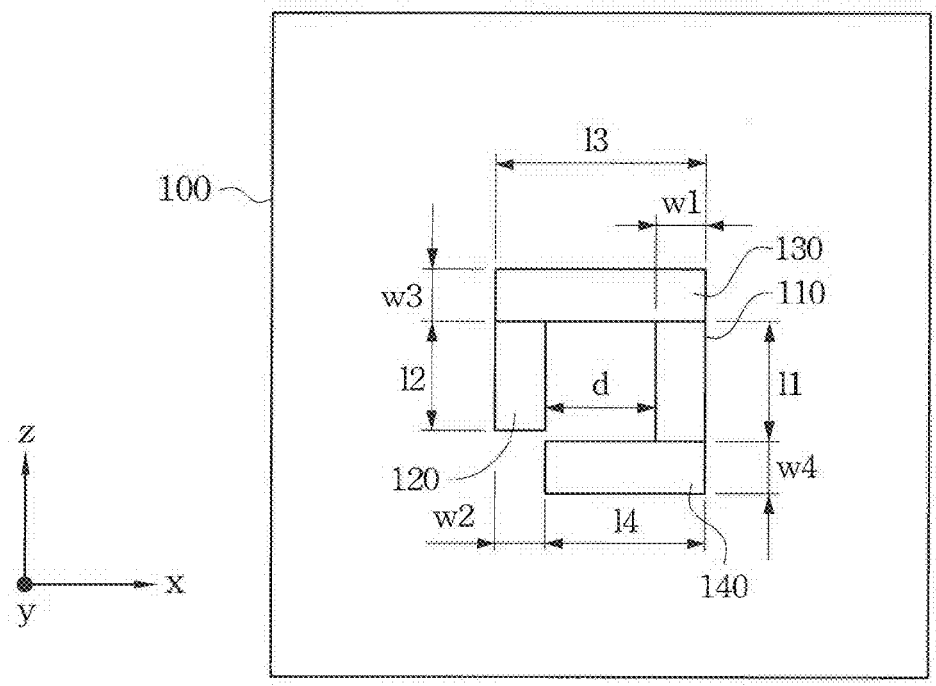
FIG. 5E is a schematic top view of the metallic structure according to a fifth example of applying the third embodiment.

Referring to FIG. 5E, FIG. 5E is a schematic top view of the metallic structure according to the fifth example of applying the third embodiment, wherein the third metallic block 130 contacts the first metallic block 110 and the second metallic block 120, and the fourth metallic block 140 contacts the first metallic block 110 but does not contact the second metallic block 120. The length l1 of the first metallic block 110 is 0.32 µm; the width w1 thereof is 0.16 µm; and the thickness t1 thereof is 0.08 µm. The length l2 of the second metallic block 120 is 0.31 µm; the width w2 thereof is 0.16 µm; and the thickness t2 thereof is 0.08 µm. The length l3 of the third metallic block 130 is 0.64 µm; the width w3 thereof is 0.16 µm; and the thickness t3 thereof is 0.08 µm. The length l4 of the third metallic block 130 is 0.47 µm; the width w4 thereof is 0.16 µm; and the thickness t4 thereof is 0.08 µm. The predetermined distance d between the first metallic block 110 and the second metallic block 120 is 0.32 µm.

From FIG. 6A and FIG. 6B, it can be known that the length l1, the width w1 of the first metallic block 110, and the predetermined distance d of this example satisfy the aforementioned equations (1)-(4), and the metallic structure of this example has good filtering and polarizing effects. It is worthy of being noted that, since the metallic structure of this embodiment is symmetrical to its center point, the distribution curve of x-axis transmittance versus wavelength is identical to that of z-axis transmittance versus wavelength.

Sixth Example

Figure 5F:
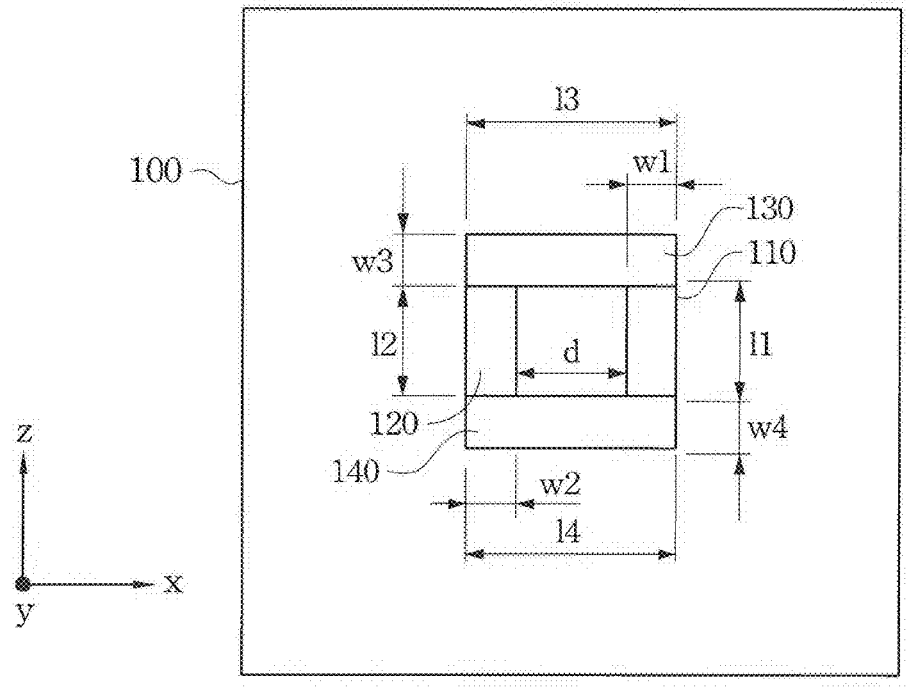
FIG. 5F is a schematic top view of the metallic structure according to a sixth example of applying the third embodiment.

Referring to FIG. 5F, FIG. 5F is a schematic top view of the metallic structure according to the sixth example of applying the third embodiment, wherein the third metallic block 130 and the fourth metallic block 140 simultaneously contact the first metallic block 110 and the second metallic block 120. The length l1 of the first metallic block 110 is 0.32 µm; the width w1 thereof is 0.16 µm; and the thickness t1 thereof is 0.08 µm. The length l2 of the second metallic block 120 is 0.32 µm; the width w2 thereof is 0.16 µm; and the thickness t2 thereof is 0.08 µm. The length l3 of the third metallic block 130 is 0.64 µm; the width w3 thereof is 0.16 µm; and the thickness t3 thereof is 0.08 µm. The length l4 of the third metallic block 130 is 0.64 µm; the width w4 thereof is 0.16 µm; and the thickness t4 thereof is 0.08 µm. The predetermined distance d between the first metallic block 110 and the second metallic block 120 is 0.32 µm.

From FIG. 6A and FIG. 6B, it can be known that the length l1, the width w1 of the first metallic block 110, and the predetermined distance d of this example satisfy the aforementioned equations (1)-(4), and the metallic structure of this example has good filtering and polarizing effects. It is worthy of being noted that, since the metallic structure of this embodiment is symmetrical to its center point, the distribution curve of x-axis transmittance versus wavelength is identical to that of z-axis transmittance versus wavelength.

Seventh Example

Figure 5G:
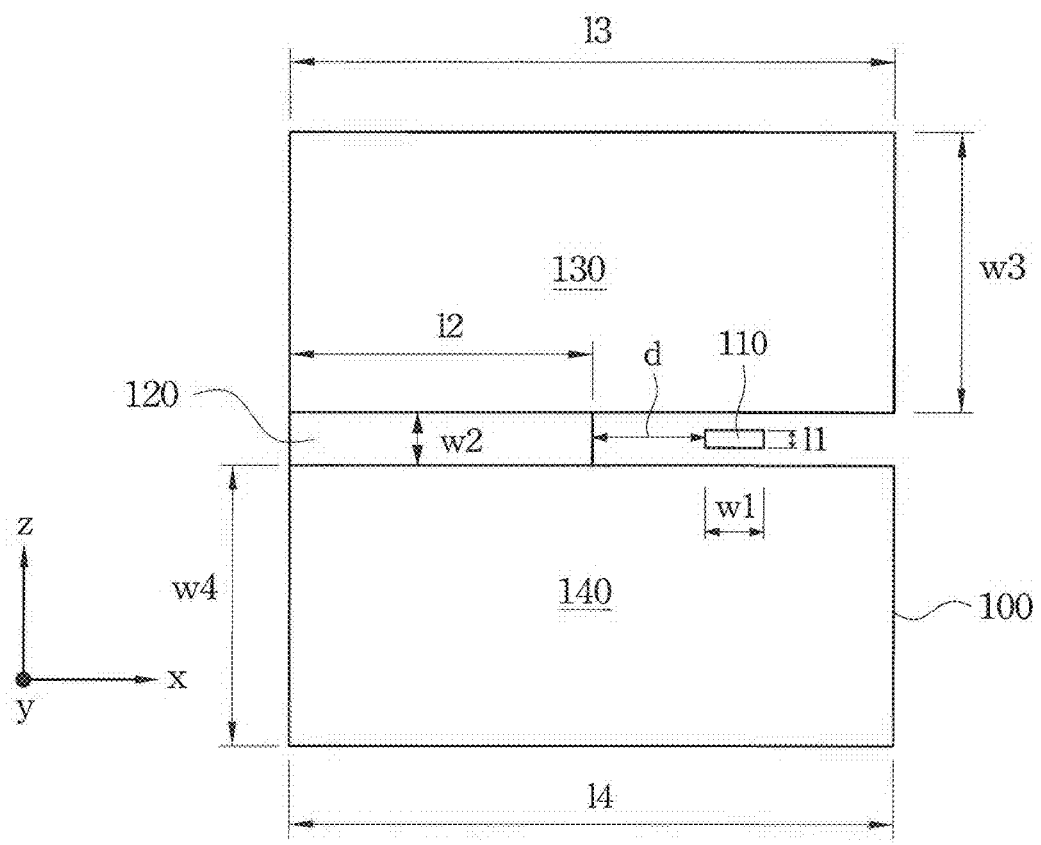
FIG. 5G is a schematic top view of the metallic structure according to a seventh example of applying the third embodiment.

Referring to FIG. 5G, FIG. 5G is a schematic top view of the metallic structure according to the seventh example of applying the third embodiment, wherein the third metallic block 130 and the fourth metallic block 140 do not contact the first metallic block 110 but contact the second metallic block 120, and the size of the second metallic block 120, the third metallic block 130, and the forth metallic block are much greater than that of the first metallic block 110. The length l1 of the first metallic block 110 is 0.6 µm; the width w1 thereof is 0.16 µm; and the thickness t1 thereof is 0.08 µm. The length l2 of the second metallic block 120 is 0.64 µm; the width w2 thereof is 1.84 µm; and the thickness t2 thereof is 0.08 µm. The length l3 of the third metallic block 130 is 4.00 µm; the width w3 thereof is 1.68 µm; and the thickness t3 thereof is 0.08 µm. The length l4 of the third metallic block 130 is 4.00 µm; the width w4 thereof is 1.68 µm; and the thickness t4 thereof is 0.08 µm. The predetermined distance d between the first metallic block 110 and the second metallic block 120 is 0.32 µm.

From FIG. 6A and FIG. 6B, it can be known that the length l1, the width w1 of the first metallic block 110, and the predetermined distance d of this example satisfy the aforementioned equations (1)-(4), and the metallic structure of this example has good filtering and polarizing effects.

Fourth Embodiment

Each of the aforementioned metallic structures of the respective embodiments (examples) can be repetitively formed as a metallic array including a plurality of array units. Each array unit includes the aforementioned first metallic block, the aforementioned second metallic block, and/or the aforementioned third metallic block and/or the aforementioned first metallic block. These metallic blocks also can be arranged in the respective patterns shown in the aforementioned embodiments (examples). Hereinafter, the metallic structure shown in the first example of the third embodiment is used again for explaining the metallic array.

Figure 7A:
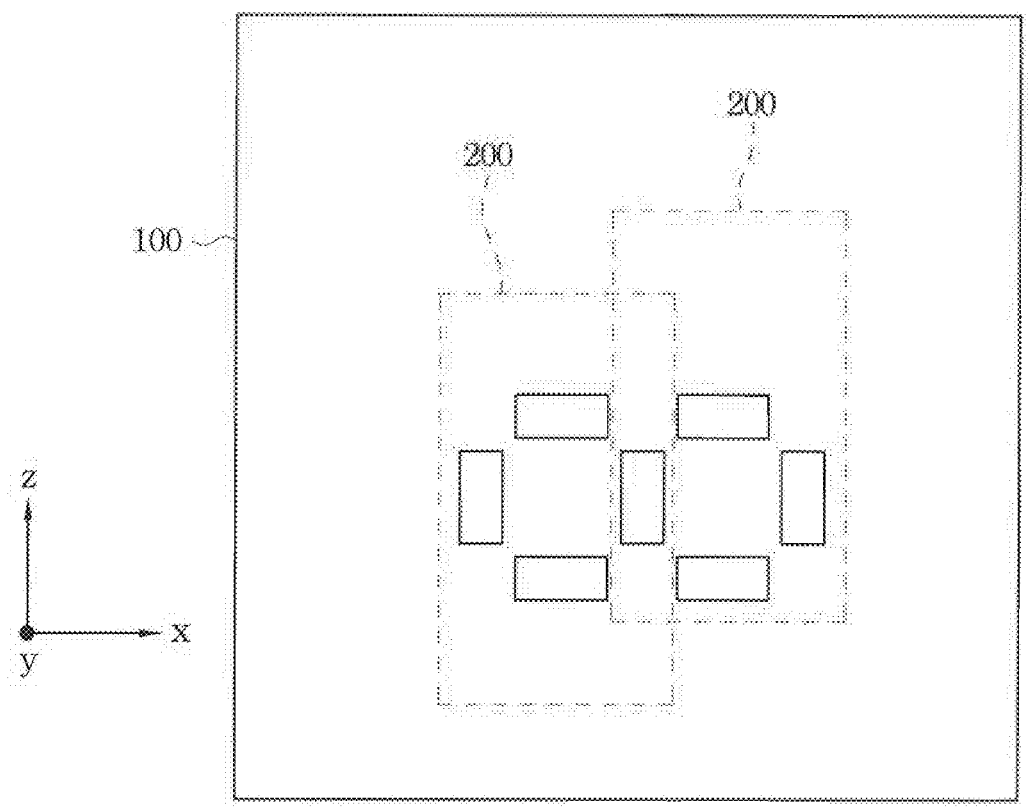
FIG. 7A is a schematic top view of a metallic structure according to an example of applying a fourth embodiment of the present invention.

Referring to FIG. 7A, FIG. 7A is schematic top view of a metallic structure according to an example of applying a fourth embodiment of the present invention, wherein the metallic array includes a plurality of metallic units 200, and each metallic unit 200 includes the first, second, third, and fourth metallic blocks shown in the first example of applying the third embodiment.

Figure 7B:
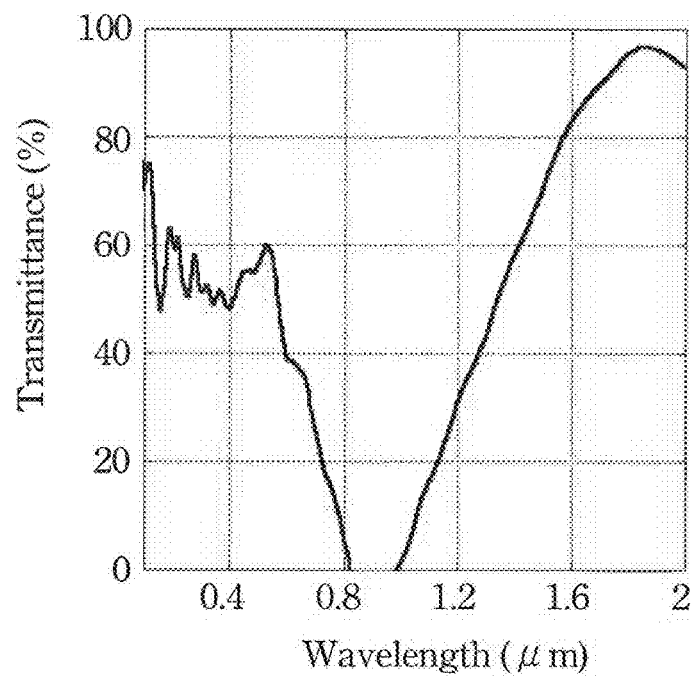
FIG. 7B shows distribution curves of x-axis transmittance versus wavelength obtained by simulating the example of applying the fourth embodiment.
Figure 7C:
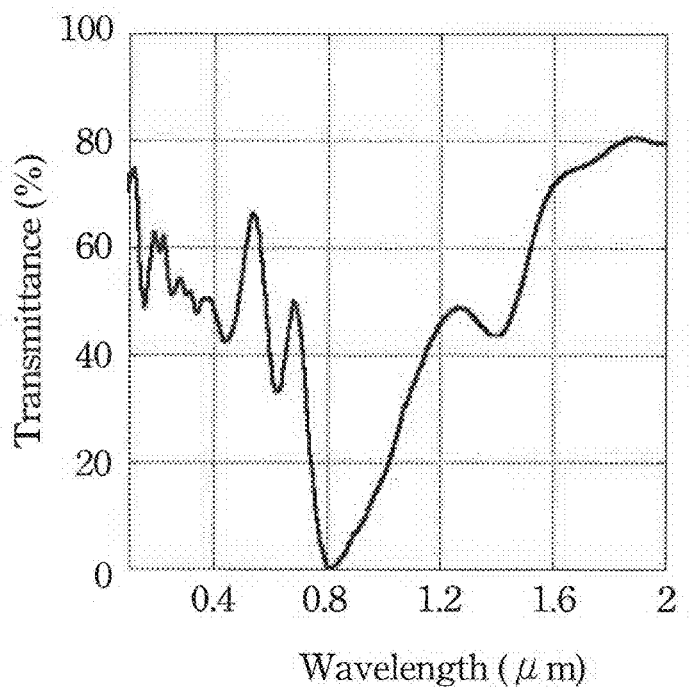
FIG. 7C shows distribution curves of z-axis transmittance versus wavelength obtained by simulating the example of applying the fourth embodiment.

Referring to FIG. 7B and FIG. 7C, FIG. 7B shows distribution curves of x-axis transmittance versus wavelength obtained by simulating the example of applying the fourth embodiment, and FIG. 7C shows distribution curves of z-axis transmittance versus wavelength obtained by simulating the example of applying the fourth embodiment.

From FIG. 7B and FIG. 7C, it can be known that the length l1, the width w1 of the first metallic block 110, and the predetermined distance d of this example satisfy the aforementioned equations (1)-(4), and the metallic structure of this example has good filtering and polarizing effects.

Fifth Embodiment

Each of the aforementioned metallic structures of the respective embodiments (examples) can be disposed in a metallic frame formed from a metallic material. A metallic structure of this embodiment includes the aforementioned first metallic block, the aforementioned second metallic block, and/or the aforementioned third metallic block and/or the aforementioned forth metallic block. These metallic blocks also can be arranged in the respective patterns shown in the aforementioned embodiments (examples). Hereinafter, disposing the metallic structure shown in the first example of the first embodiment in a metallic frame is used as an example for explanation.

Figure 8A:
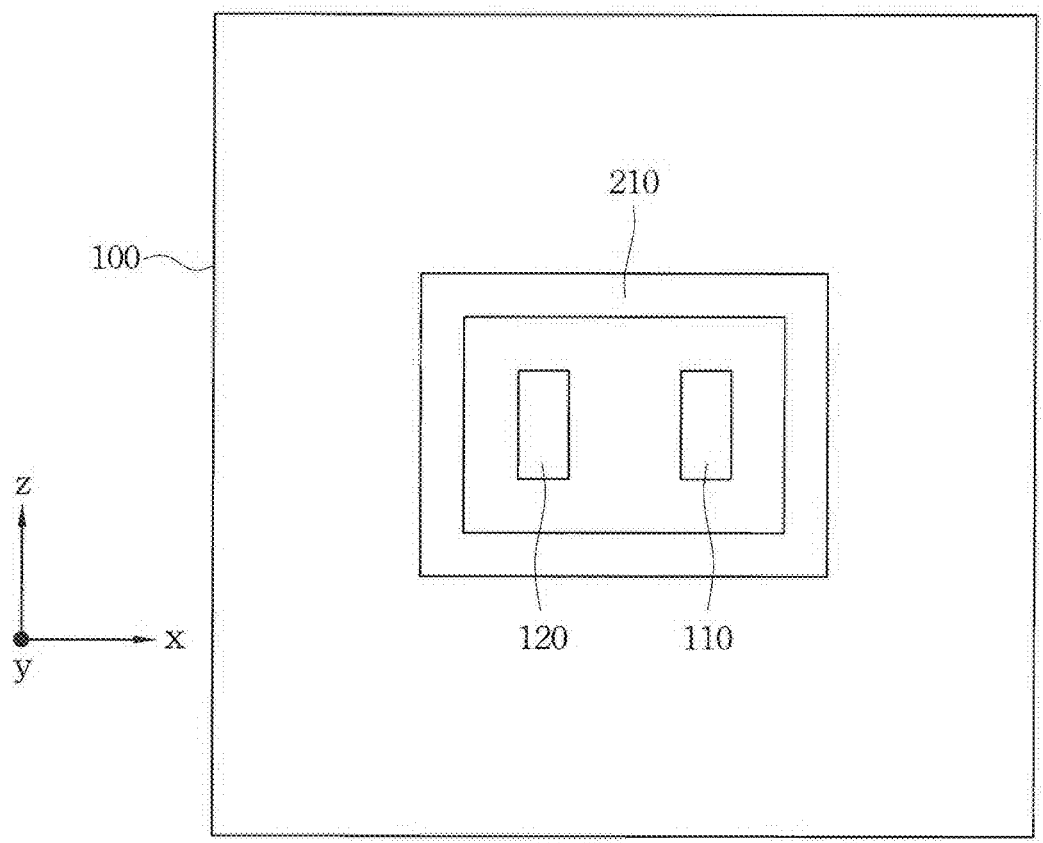
FIG. 8A is schematic top view of a metallic structure according to an example of applying a fifth embodiment of the present invention.

Referring to FIG. 8A, FIG. 8A is schematic top view of a metallic structure according to an example of applying a fifth embodiment of the present invention, wherein the first metallic block 110 and the second metallic block 120 shown in the first example of applying the first embodiment is disposed in a metallic frame 210.

Figure 8B:
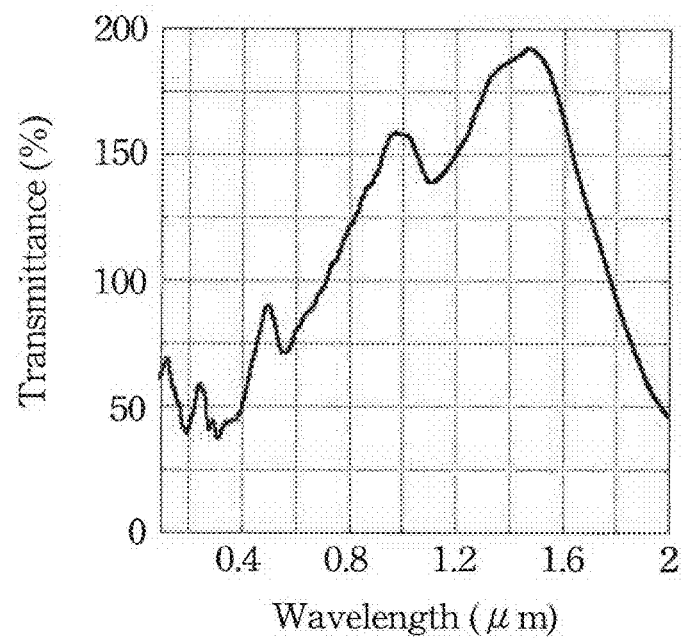
FIG. 8B shows distribution curves of x-axis transmittance versus wavelength obtained by simulating the example of applying the fifth embodiment.
Figure 8C:
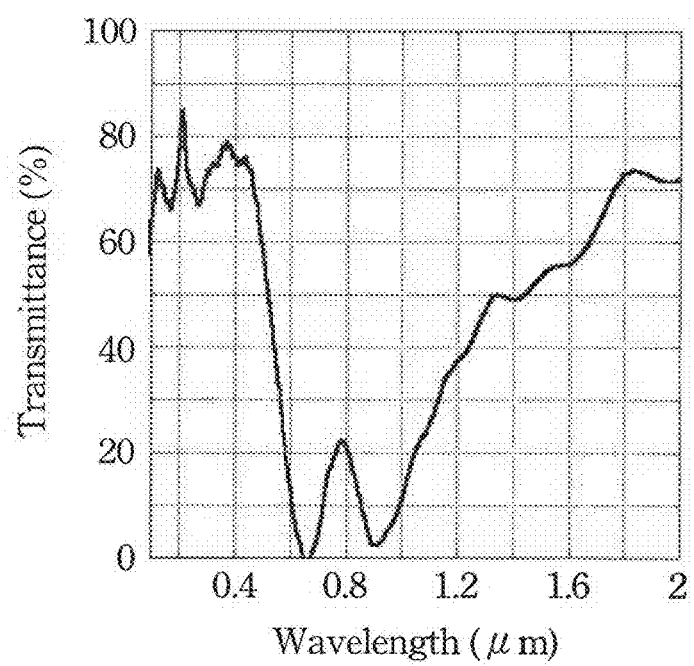
FIG. 8C shows distribution curves of z-axis transmittance versus wavelength obtained by simulating the example of applying the fifth embodiment.

Referring to FIG. 8B and FIG. 8C, FIG. 8B shows distribution curves of x-axis transmittance versus wavelength obtained by simulating the example of applying the fifth embodiment, and FIG. 8C shows distribution curves of z-axis transmittance versus wavelength obtained by simulating the example of applying the fifth embodiment.

From FIG. 8B and FIG. 8C, it can be known that the length 11, the width w1 of the first metallic block 110, and the predetermined distance d of this example satisfy the aforementioned equations (1)-(4), and the metallic structure of this example has good filtering and polarizing effects.

It is particularly noted that the aforementioned examples of the respective embodiments are merely used as examples for explanation, and do not intend to limit the present invention. Therefore, the applications of the metallic structures of the present invention are not limited thereto.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A metallic structure for filtering or polarizing an electromagnetic wave, the metallic structure comprising:
    a light-transmissible medium;
    a first metallic block disposed inside or over the light-transmissible medium; and
    a second metallic block disposed inside or over the light-transmissible medium, wherein the first metallic block and the second metallic block are parallel to and spaced from each other at a predetermined distance, wherein the electromagnetic wave is incident on the first metallic block and the second metallic block and into between the first metallic block and the second metallic block, and after passing through the metallic structure, the electromagnetic wave has a distribution curve of transmittance versus wavelength, wherein the distribution curve has at least one transmittance peak value, and the at least one transmittance peak value is corresponding to at least one wavelength in a one-to-one manner, the predetermined distance and an averaged width of the first metallic block satisfying the following relationships:

$d<\lambda; 0.01\lambda<w<d,$ where d represents the predetermined distance; $\lambda$ represents one of the at least one wavelength; w represents an averaged width of the first metallic block;
    an averaged length of the first metallic block satisfying the following relationship:

$l<2\lambda,$ wherein l represents the averaged length of the first metallic block;
        wherein $\lambda$ is corresponding to one of the at least one transmittance peak value, and the one of at least one transmittance peak value is a first transmittance peak value, and the first transmittance peak value is greater than 10%, and a spectrum half width corresponding to between the wavelength of the first transmittance peak value and the wavelength whose transmittance is 70% of the first transmittance peak value is smaller than $2\lambda/3$.

2. The metallic structure as claimed in claim 1, wherein the predetermined distance and the averaged width of the first metallic block satisfies the following relationship:

$d+w<\lambda.$

3. The metallic structure as claimed in claim 1, wherein the electromagnetic wave comprises a range of wavelengths substantially between 0.1 μm and 12 μm.

4. The metallic structure as claimed in claim 1, further comprising:
    a third metallic block which is elongated and is disposed inside or over the light-transmissible medium and is adjacent to one side of the first metallic block and the second metallic block.

5. The metallic structure as claimed in claim 4, wherein the third metallic block does not simultaneously contact the first metallic block and the second metallic block.

6. The metallic structure as claimed in claim 4, wherein an extension of the third metallic block is substantially perpendicular to extensions of the first metallic block and the second metallic block.

7. The metallic structure as claimed in claim 4, further comprising:
    a fourth metallic block which is disposed inside or over the light-transmissible medium and is adjacent to the other side of the first metallic block and the second metallic block.

8. The metallic structure as claimed in claim 7, wherein the fourth metallic block does not simultaneously contact the first metallic block and the second metallic block.

9. The metallic structure as claimed in claim 7, wherein an extension of the fourth metallic block is substantially perpendicular to extensions of the first metallic block and the second metallic block.

10. The metallic structure as claimed in claim 7, wherein the fourth metallic block is spaced from the third metallic block at a distance smaller than $2\lambda$.

11. The metallic structure as claimed in claim 7, further comprising:
    a metallic frame disposed inside or over the light-transmissible medium, wherein the first metallic block, the second metallic block, the third metallic block or the fourth metallic block is disposed inside or overlapped with the metallic frame.

12. An opto-electronic apparatus, comprising:
    a metallic structure as claimed in claim 1.

13. The metallic structure as claimed in claim 1, wherein the first transmittance peak value is greater than 40%.

14. A metallic structure for filtering or polarizing an electromagnetic wave, the metallic structure comprising:
    a light-transmissible medium;
    a metallic array disposed inside or over the light-transmissible medium, the metallic array comprising a plurality of array units, each of the metallic array units comprising:
        a first metallic block; and
        a second metallic block which is parallel to and spaced from the first metallic block at a predetermined distance, wherein the electromagnetic wave is incident on the first metallic block and the second metallic block and into between the first metallic block and the second metallic block, and after passing through the metallic structure, the electromagnetic wave has a distribution curve of transmittance versus wavelength, wherein the distribution curve has at least one transmittance peak value, and the at least one transmittance peak value is corresponding to at least one wavelength in a one-to-one manner, the predetermined distance and an averaged width of the first metallic block satisfying the following relationships:

$d<\lambda; 0.01\lambda<w<d,$ where d represents the predetermined distance; λ represents one of the at least one wavelength; w represents an averaged width of the first metallic block;

an averaged length of the first metallic block satisfying the following relationship:

$l < 2\lambda,$ wherein l represents the averaged length of the first metallic block;

wherein λ is corresponding to one of the at least one transmittance peak value, and the one of at least one transmittance peak value is a first transmittance peak value, and the first transmittance peak value is greater than 10%, and a spectrum half width corresponding to between the wavelength of the first transmittance peak value and the wavelength whose transmittance is 70% of the first transmittance peak value is smaller than 2λ/3.

15. The metallic structure as claimed in claim 14, wherein the predetermined distance and the averaged width of the first metallic block satisfies the following relationship:

$d + w < \lambda.$

16. The metallic structure as claimed in claim 14, wherein the electromagnetic wave comprises a range of wavelengths substantially between 0.1 μm and 12 μm.

17. The metallic structure as claimed in claim 14, wherein at least one of the metallic array units further comprises:
a third metallic block which is elongated and is disposed inside or over the light-transmissible medium and is adjacent to one side of the first metallic block and the second metallic block.

18. The metallic structure as claimed in claim 17, wherein the third metallic block does not simultaneously contact the first metallic block and the second metallic block.

19. The metallic structure as claimed in claim 17, wherein the at least one of the metallic array units further comprises:
a fourth metallic block which is disposed inside or over the light-transmissible medium and is adjacent to the other side of the first metallic block and the second metallic block.

20. The metallic structure as claimed in claim 17, wherein the fourth metallic block does not simultaneously contact the first metallic block and the second metallic block.

21. The metallic structure as claimed in claim 19, wherein an extension of the third metallic block or the fourth metallic block is substantially perpendicular to extensions of the first metallic block and the second metallic block.

22. The metallic structure as claimed in claim 19, further comprising:
a metallic frame disposed inside or over the light-transmissible medium, wherein the first metallic block, the second metallic block, the third metallic block or the fourth metallic block is disposed inside or overlapped with the metallic frame.

23. An opto-electronic apparatus, comprising:
a metallic structure as claimed in claim 14.

24. The metallic structure as claimed in claim 14, wherein the first transmittance peak value is greater than 40%.

* * * * *